United States Patent
Kazmi et al.

(10) Patent No.: US 10,631,352 B2
(45) Date of Patent: Apr. 21, 2020

(54) JOINT WAN AND SIDELINK TRANSMISSION METHODS FOR DEVICE-TO-DEVICE CAPABLE USER EQUIPMENT

(71) Applicant: Telefonaktiebolaget LM Ericsson (publ), Stockholm (SE)

(72) Inventors: Muhammad Kazmi, Sundbyberg (SE); Shaohua Li, Beijing (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 293 days.

(21) Appl. No.: 15/565,699

(22) PCT Filed: Apr. 7, 2016

(86) PCT No.: PCT/SE2016/050294
§ 371 (c)(1),
(2) Date: Oct. 11, 2017

(87) PCT Pub. No.: WO2016/167703
PCT Pub. Date: Oct. 20, 2016

(65) Prior Publication Data
US 2018/0077748 A1    Mar. 15, 2018

Related U.S. Application Data

(60) Provisional application No. 62/146,735, filed on Apr. 13, 2015.

(51) Int. Cl.
*H04W 76/15* (2018.01)
*H04W 92/18* (2009.01)
(Continued)

(52) U.S. Cl.
CPC .......... *H04W 76/15* (2018.02); *H04L 5/0044* (2013.01); *H04W 76/14* (2018.02); *H04W 92/18* (2013.01);
(Continued)

(58) Field of Classification Search
CPC ..... H04W 76/15; H04W 76/14; H04W 92/18; H04W 76/23; H04W 8/005; H04W 8/24;
(Continued)

(56) References Cited

U.S. PATENT DOCUMENTS

| 8,542,605 | B2 * | 9/2013 | Chen ................. | H04W 72/0453 370/252 |
| 2009/0170475 | A1 * | 7/2009 | Ch'ng ................. | H04W 12/02 455/411 |

(Continued)

FOREIGN PATENT DOCUMENTS

| WO | 2013104084 A1 | 7/2013 |
| WO | 2014168571 A2 | 10/2014 |
| WO | 2016024187 A1 | 2/2016 |

OTHER PUBLICATIONS

3GPP RAN WG1 Meeting #78BIS; Ljubljana, Slovenia; Title: LS on soft buffer management for D2D communications; Source: RAN1 (R1-144524)—Oct. 6-10, 2014.
(Continued)

*Primary Examiner* — Ivan O Latorre
(74) *Attorney, Agent, or Firm* — Sage Patent Group

(57) ABSTRACT

A method in a network node (110) is disclosed. The method comprises determining (404) whether a wireless device (121) is configured to receive signals over both a first communication link (131, 132) and a second communication link (140) during at least partly overlapping time resources, and determining (412) whether the wireless device (121) has limited reception capability based at least in part on a
(Continued)

comparison of at least one reception capability of the wireless device to a threshold. The method comprises upon determining that the wireless device is configured to receive signals over both the first communication link (131, 132) and the second communication link (140) during at least partly overlapping time resources and that the wireless device (121) has limited reception capability, adapting (416) one or more transmission parameters of one or both of the first communication link (131, 132) and the second communication link (140).

24 Claims, 10 Drawing Sheets

(51) Int. Cl.
  *H04W 76/14* (2018.01)
  *H04L 5/00* (2006.01)
  *H04W 8/00* (2009.01)
  *H04W 8/24* (2009.01)
  *H04W 76/23* (2018.01)
  *H04W 76/20* (2018.01)
  *H04L 1/18* (2006.01)
  *H04L 5/22* (2006.01)

(52) U.S. Cl.
  CPC .......... *H04L 1/1812* (2013.01); *H04L 5/0091* (2013.01); *H04L 5/22* (2013.01); *H04W 8/005* (2013.01); *H04W 8/24* (2013.01); *H04W 76/20* (2018.02); *H04W 76/23* (2018.02)

(58) Field of Classification Search
  CPC ........ H04W 76/20; H04L 1/1812; H04L 5/22; H04L 5/0091; H04L 5/0044
  See application file for complete search history.

(56) References Cited

U.S. PATENT DOCUMENTS

| | | | |
|---|---|---|---|
| 2014/0094183 A1* | 4/2014 | Gao | H04W 72/048 455/450 |
| 2016/0143050 A1* | 5/2016 | Saiwai | H04W 72/1263 370/329 |
| 2016/0295380 A1* | 10/2016 | Pitchaiah | H04L 1/16 |
| 2017/0079035 A1* | 3/2017 | Seo | H04W 72/1242 |
| 2018/0092147 A1* | 3/2018 | Pelletier | H04L 63/205 |

OTHER PUBLICATIONS

3GPP TSG-RAN WG4 #73; San Francisco, USA; Source: Ericsson; Title: Discussion on D2D receiver regarding soft buffer sharing and soft combining issue (R4-147437)—Nov. 17-21, 2014.

PCT International Search Report for International application No. PCT/SE2016/050294—dated Jun. 16, 2016.

PCT Written Opinion of the International Searching Authority for International application No. PCT/SE2016/050294—dated Jun. 16, 2016.

MCC Support: "Final Report of 3GPP TSG RAN WG1 #79 v1.0.0", 3GPP Draft; Final_minutes_report_RAN1#79_v100, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 2015.

Extended European Search Report for Application No. 16780374.1, dated Nov. 16, 2018, 6 pages.

* cited by examiner

JOINT WAN AND SIDELINK TRANSMISSION METHODS FOR DEVICE-TO-DEVICE CAPABLE USER EQUIPMENT

PRIORITY

This nonprovisional application is a U.S. National Stage Filing under 35 U.S.C. § 371 of International Patent Application Serial No. PCT/SE2016/050294 filed Apr. 7, 2016, and entitled "JOINT WAN AND SIDELINK TRANSMISSION METHODS FOR DEVICE-TO-DEVICE CAPABLE USER EQUIPMENT" which claims priority to U.S. Provisional Patent Application No. 62/146,735 filed Apr. 13, 2015, both of which are hereby incorporated by reference in their entirety.

TECHNICAL FIELD

The present disclosure relates, in general, to wireless communications and, more particularly, to joint WAN and sidelink transmission methods for device-to-device capable user equipment.

BACKGROUND

Proximity-based applications and services represent an emerging social-technological trend. In 3GPP, a Proximity Services (ProSe) capability in LTE is introduced in Rel-12. It is also known as device-to-device (D2D) communication. D2D communication would allow the 3GPP industry to serve this developing market, and will at the same time serve the urgent needs of several Public Safety communities that are jointly committed to LTE. ProSe normative specification is important for enabling economy of scale advantages (i.e., that the resulting system can be used for both Public Safety and non-Public-Safety services, where possible).

A D2D user equipment (UE) may be interchangeably referred to as a ProSe capable UE. A D2D discovery capable UE may be interchangeably referred to as a UE capable of ProSe direct discovery. A D2D direct communication UE may be interchangeably referred to as a UE capable of ProSe direct communication. The radio link and carrier frequency that is used for D2D operation (e.g., ProSe direct communication and/or ProSe direct discovery between UEs) is referred to as sidelink. For example, the UL carrier in Frequency Division Duplex (FDD) or UL subframes in Time Division Duplex (TDD) in a cell can be used as sidelink (i.e., for configuring resources such as subframes for ProSe operation). The cellular transmission and reception may also be interchangeably referred to as Wide Area Network (WAN) transmission and reception, respectively.

In 3GPP, the soft buffer sharing issue is discussed in R1-144524, "LS on soft buffer management for D2D communications," 3GPP. Based on the 3GPP RAN1 discussion, 3GPP has the following agreements. There is no standardized mechanism defined for D2D communication and discovery to share the soft buffer already defined for cellular communications. A UE with limited reception capabilities shall at a given time first prioritize downlink reception (i.e., reception of WAN signals), followed by sidelink communication reception, sidelink discovery reception on carriers configured by the eNodeB, and sidelink discovery reception on carriers not configured by the eNodeB.

It has been proposed to only use discontinuous reception (DRX) occasions in CONNECTED or IDLE to perform both ProSe discovery and communication reception in order to save the total required memory and/or processor resources at the UE. This approach, however, would require that the WAN transmission be multiplexed with the D2D transmission in time division multiplexing (TDM) manner. With the TDM approach, the D2D transmission cannot be concurrently received with the WAN transmission at the UE. Furthermore, the latency of transmitting data on both WAN link and sidelink may also increase. Thus, such a TDM method may not be suitable for latency critical or delay sensitive services.

It has also been proposed to not consider soft combining for D2D communication and discovery in order to save the required memory and/or processor resources at the UE. When soft combining is not considered, however, link level simulation results show that about 2-3.5 dB degradation is observed. Consequently, a lot of resources are wasted. Furthermore, without soft combining, the D2D coverage will shrink due to the performance degradation. In addition, the bad performance of lower layers (e.g., physical layer) may trigger higher layer transmission, and may further worsen the experience of D2D service. Thus, there is a need to improve the spectrum efficiency and reception performance for the D2D capable UE with limited reception capability.

SUMMARY

To address the foregoing problems with existing approaches, disclosed is a method in a network node. The method comprises determining whether a wireless device is configured to receive signals over both a first communication link and a second communication link during at least partly overlapping time resources. The method comprises determining whether the wireless device has limited reception capability based at least in part on a comparison of at least one reception capability of the wireless device to a threshold. The method comprises upon determining that the wireless device is configured to receive signals over both the first communication link and the second communication link during at least partly overlapping time resources and that the wireless device has limited reception capability, adapting one or more transmission parameters of one or both of the first communication link and the second communication link.

In certain embodiments, the first communication link may comprise a wide area network communication link and the second communication link may comprise a device-to-device communication link. The wireless device may comprise a device-to-device capable wireless device. In certain embodiments, the method may comprise communicating to the wireless device an indication of one or more adaptations to the one or more transmission parameters of one or both of the first communication link and the second communication link. In certain embodiments, determining whether the wireless device is configured to receive signals over both the first communication link and the second communication link during at least partly overlapping time resources may comprise retrieving a configuration for the wireless device from a memory of the network node.

In certain embodiments, the method may comprise receiving capability information for the wireless device, wherein the received capability information comprises one or more reception capabilities of the wireless device, the one or more reception capabilities comprising one or more of: an indication of a maximum data rate for one or both of the first communication link and the second communication link; an indication of a maximum data block size for one or both of the first communication link and the second communication link; an indication of one or more adaptations to the one or more transmission parameters of one or both of the first communication link and the second communication link; and one or more characteristics of a transport format supported by the wireless device.

In certain embodiments, determining whether the wireless device has limited reception capability may comprise comparing at least one of the one or more reception capabilities of the received capability information to one or more thresholds, and determining, based on the comparison of the at least one reception capability to the one or more thresholds, whether the wireless device has limited reception capability. In certain embodiments, determining whether the wireless device has limited reception capability may comprise evaluating one or more reception capabilities of the wireless device related to reception of signals over the first communication link and the second communication link, and comparing at least one of the one or more reception capabilities of the wireless device to one or more thresholds, the one or more reception capabilities comprising one or more of: a data rate for one or both of the first communication link and the second communication link over one or more previous time resources and a data throughput for one or both of the first communication link and the second communication link over one or more previous time resources.

In certain embodiments, adapting one or more transmission parameters of one or both of the first communication link and the second communication link may comprise one or more of: adjusting a transport format of the first communication link to enable the wireless device to use fewer resources for receiving signals over the first communication link; reducing a number of physical channels used for the first communication link to enable the wireless device to use fewer resources for receiving signals over the first communication link; limiting a maximum number of hybrid-acknowledgement repeat request processes used for the first communication link; and increasing a number of time resources used for receiving signals over the second communication link.

In certain embodiments, the method may comprise determining whether the wireless device is using or intends to use a data rate on the first communication link above a first threshold, and determining whether the wireless device is using or intends to use a data rate on the second communication link above a second threshold, wherein adapting one or more transmission parameters of one or both of the first communication link and the second communication link is based at least in part on whether the data rate on the first communication link is determined to be above the first threshold and whether the data rate on the second communication link is determined to be above the second threshold. Determining whether the wireless device is using or intends to use a data rate on the first communication link above a first threshold may comprise determining an amount of data for the wireless device in a buffer of the network node. Determining whether the wireless device is using or intends to use a data rate on the second communication link above a second threshold may comprise one or more of: detecting reception of one or more uplink subframes by one or more other wireless devices over the second communication link, receiving an indication from the wireless device that the wireless device is receiving signals over the second communication link; receiving an indication that the wireless device is capable of using soft combining for receiving signals over the second communication link; and receiving an indication from the wireless device that the wireless device has limited reception capabilities in terms of one or more of: a maximum data rate while receiving signals over both the first communication link and the second communication link; a maximum size of a soft buffer that can be supported while the wireless device is receiving signals over both the first communication link and the second communication link; a preferred transport format for the first communication link; and a preferred or a maximum number of HARQ processes.

Also disclosed is a network node. The network node comprises one or more processors. The one or more processors are configured to determine whether a wireless device is configured to receive signals over both a first communication link and a second communication link during at least partly overlapping time resources. The one or more processors are configured to determine whether the wireless device has limited reception capability based at least in part on a comparison of at least one reception capability of the wireless device to a threshold. The one or more processors are configured to upon determining that the wireless device is configured to receive signals over both the first communication link and the second communication link during at least partly overlapping time resources and that the wireless device has limited reception capability, adapt one or more transmission parameters of one or both of the first communication link and the second communication link.

Also disclosed is a method in a wireless device. The method comprises determining that the wireless device is configured to receive signals over both a first communication link and a second communication link during at least partly overlapping time resources. The method comprises determining a status of at least one of a memory resource and a processor resource of the wireless device for signals received over both the first communication link and the second communication link. The method comprises adapting one or more procedures related to reception of signals over one or both of the first communication link and the second communication link based at least in part on the determined status of the at least one of a memory resource and a processor resource of the wireless device.

In certain embodiments, the first communication link may comprise a wide area network communication link and the second communication link may comprise a device-to-device communication link. The wireless device may comprise a device-to-device capable wireless device. In certain embodiments, the method may comprise receiving, from a network node, information about an adaptation of one or more transmission parameters of one or both of the first communication link and the second communication link by the network node. Adapting one or more procedures related to reception of signals over one or both of the first communication link and the second communication link may be further based at least in part on the received information about the adaptation of one or more transmission parameters by the network node.

In certain embodiments, the method may comprise determining, based on the received information about the adaptation of one or more transmission parameters by the network node, that additional memory and processor resources are available for signals received over the second communication link, and using the additional memory and processor resources available for signals received over the second communication link for one or more of: soft combining a plurality of retransmissions over the second communication link; and monitoring additional processes over the second communication link.

In certain embodiments, adapting one or more procedures related to reception of signals over one or both of the first communication link and the second communication link based at least in part on the determined status of at least one of the wireless device's memory and processor resources may comprise one or more of: modifying one or more parameters related to a reception algorithm used by a receiver of the wireless device; combining fewer retransmissions; selecting fewer processes to monitor on one of the first communication link and the second communication link; modifying a first portion of a buffer associated with the first communication link and a second portion of the buffer associated with the second communication link.

In certain embodiments, the method may comprise communicating capability information for the wireless device to a network node, wherein the communicated capability information comprises one or more of: an indication of a maximum data rate for one or both of the first communication link and the second communication link; an indication of a maximum data block size for one or both of the first communication link and the second communication link; an indication of one or more adaptations to the one or more transmission parameters of one or both of the first communication link and the second communication link; and one or more characteristics of a transport format supported by the wireless device.

Also disclosed is a wireless device. The wireless device comprises one or more processors. The one or more processors are configured to determine that the wireless device is configured to receive signals over both a first communication link and a second communication link during at least partly overlapping time resources. The one or more processors are configured to determine a status of at least one of a memory resource and a processor resource of the wireless device for signals received over both the first communication link and the second communication link. The one or more processors are configured to adapt one or more procedures related to reception of signals over one or both of the first communication link and the second communication link based at least in part on the determined status of the at least one of a memory resource and a processor resource of the wireless device.

Certain embodiments of the present disclosure may provide one or more technical advantages. For example, certain embodiments may advantageously improve utilization efficiency of a wireless device's memory and/or processor resources. As another example, certain embodiments may improve the spectrum efficiency for both the WAN link and sidelink in cases where the wireless device has limited reception capabilities. As still another example, certain embodiments may enable a wireless device to support concurrent WAN and D2D operations (including, for example, simultaneous reception of D2D and WAN signals, such as data channels). As yet another example, certain embodiments may reduce the data transmission latency for transmitting both WAN and D2D data. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
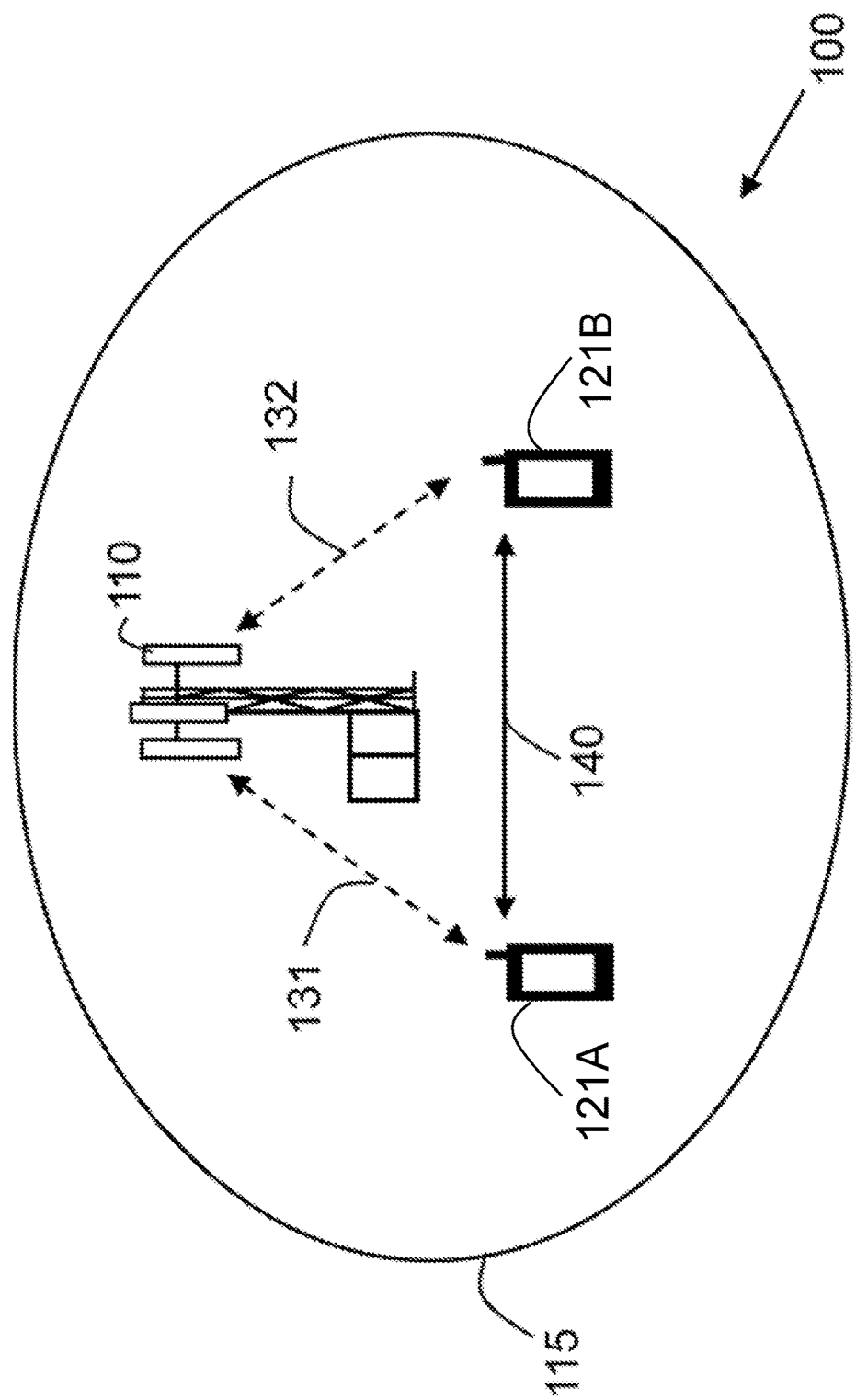
FIG. 1 illustrates an example of a wireless communications network in which D2D communication may be implemented.

As described above, there is a need to improve the spectrum efficiency and reception performance for the D2D capable UE with limited reception capabilities. The present disclosure contemplates various embodiments that may address these and other deficiencies associated with existing approaches. The various embodiments described herein may improve utilization efficiency of a wireless device's memory and/or processor resources, may improve the spectrum efficiency for both WAN link and sidelink in case the wireless device has limited reception capabilities, and may enable a wireless device to support concurrent WAN and D2D operations (including simultaneous reception of D2D and WAN signals, such as data channels). The various embodiments described herein may also reduce the data transmission latency for transmitting both WAN and D2D data.

In some cases, the improved utilization and spectrum efficiency may be achieved by adapting, in a network node, one or more transmission parameters of one or both of a first communication link (such as a WAN communication link) and a second communication link (such as a D2D communication link or sidelink). For example, in certain embodiments a method in a network node is disclosed. The network node may be a network node serving a wireless device, such as a D2D capable UE. The network node determines whether the wireless device is configured to receive signals over both the first communication link (such as the WAN communication link) and the second communication link (such as the D2D communication link) during at least partly overlapping time resources (e.g., partly overlapping D2D subframe(s) on sidelink and WAN subframe(s) in downlink (DL)).

The network node determines whether the wireless device has limited reception capability. The network node may determine whether the wireless device has limited reception capability in any suitable manner. For example, in certain embodiments the network node may determine whether the wireless device has limited reception capability based at least in part on a comparison of at least one reception capability of the wireless device to a threshold.

Upon determining that the wireless device is configured to receive signals over both the first communication link and the second communication link during at least partly overlapping time resources and that the wireless device has limited reception capability, the network node adapts one or more transmission parameters of one or both of the first communication link and the second communication link.

As one example, in certain embodiments the network node may adapt or adjust a data rate or assigned resources or resources to be assigned for WAN and/or D2D to enhance overall performance of both WAN and D2D for a D2D capable UE with limited reception capabilities, when configured to perform both D2D and WAN operations during at least partly overlapping time in sidelink and in DL for WAN reception. The network node may determine the UE capability in terms of receiving both D2D and WAN signals during partly or fully overlapping time. Upon determining that the UE has limited capability in terms of receiving both D2D and WAN signals during partly or fully overlapping time, the network node may modify or adapt or assign the data rate on WAN link and/or on sidelink jointly to enable the UE to receive necessary data on both WAN link and sidelink, at least during partly overlapping time. The network node may signal an indication about the adaptation of resources for WAN and/or D2D to the UE.

In some cases, the improved utilization and spectrum efficiency may be achieved by adapting, in a wireless device, one or more procedures related to reception of signals over one or both of a first communication link (such as a WAN communication link) and a second communication link (such as a D2D communication link) based at least in part on the status of at least one of a memory resource and a processor resource of the wireless device. For example, in certain embodiments a method in a wireless device is disclosed. The wireless device may be a D2D capable UE served by a network node. The wireless device determines that the wireless device is configured to receive signals over both the first communication link (such as a WAN communication link) and the second communication link (such as a D2D communication link) during at least partly overlapping time resources (e.g., partly overlapping D2D subframe(s) on sidelink and WAN subframe(s) in DL). In some cases, the wireless device may optionally receive information about an adaptation to one or more transmission parameters of one or both of the first communication link and the second communication link by the network node. The wireless device determines a status of at least one of a memory resource and a processor resource of the wireless device for signals received over both the first communication link and the second communication link. The wireless device adapts one or more procedures related to reception of signals over one or both of the first communication link and the second communication link based at least in part on the determined status of the at least one of a memory resource and a processor resource of the wireless device.

As one example, a UE may determine that the UE is receiving or is expected to receive both D2D signals on sidelink and WAN signals on DL WAN during partly or fully overlapping time resources (e.g., partly overlapping D2D subframe(s) on sidelink and WAN subframe(s) in DL). The UE may obtain information or an indication that the network node is adapting or expected to adapt assigned resources (e.g., maximum allowed data rates) for receiving D2D signals on sidelink and WAN signals on DL WAN. The UE may adapt one or more procedures for receiving at least one of the WAN signals and D2D signals during at least the partly overlapping time. The UE may adapt the one or more procedures based on one or more of the determination about reception of WAN and/or sidelink signals, and the obtained indication or information about the adaptation by the network node.

The various embodiments described herein may allow the wireless device to utilize the limited amount of memory and/or processor resources more efficiently when WAN link and D2D link are used concurrently (i.e., in at least partly overlapping D2D and WAN subframes). In certain embodiments, the adaption of procedures for WAN and D2D receptions may be accomplished by defining one or more pre-defined requirements for the wireless device (e.g., UE demodulation) in a standard.

FIG. 1 illustrates an example of a wireless communications network 100 in which D2D communication may be implemented. Wireless communications network 100 includes one or more network node(s) 110 (which may be interchangeably referred to as an eNodeB) and multiple wireless devices, including first wireless device 121A (which may be interchangeably referred to as a first UE or a first D2D capable UE) and second wireless device 121B (which may be interchangeably referred to as a second UE or a second D2D capable UE). Wireless devices 121 may also be interchangeably referred to as UEs.

Network node 110 may be any suitable type of network node. For example, network node 110 may be a base station (BS), radio base station (RBS), Node B, multi-standard radio (MSR) radio nodes such as MSR BS, evolved Node B (eNB), eNodeB, a Home Node B, a Home eNode B, femto BS, pico BS, network controller, radio network controller (RNC), base station controller (BSC), relay node, repeater, relay donor node controlling relay, base transceiver station (BTS), access point (AP), radio access point, wireless access point, an Ultra-Dense Network/Software-Defined Network (UDN/SDN) radio access node, transmission points, transmission nodes, Remote Radio Unit (RRU), Remote Radio Head (RRH), nodes in distributed antenna system (DAS), Multi-cell/multicast Coordination Entity (MCE), core network node (e.g., MSC, MME, etc.), O&M, OSS, SON, positioning node (e.g., E-SMLC), MDT, or any suitable network node capable of serving a wireless device in wireless communications network 100. Furthermore, network node 110 may comprise multiple antennas for wireless radio communication with one or more wireless devices located within their coverage range; that is, network node 110 may use one or more of its respective antennas to provide radio coverage within its cell 115.

In certain embodiments, network node 110 may interface with a radio network controller. The radio network controller may control network node 110 and may provide certain radio resource management functions, mobility management functions, and/or other suitable functions. In certain embodiments, the functions of the radio network controller may be included in network node 110. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for wireless devices 121. Wireless devices 121 may exchange certain signals with the core network node using the non-access stratum layer. In non-access stratum signaling, signals between wireless devices 121 and the core network node may be transparently passed through the RAN. In certain embodiments, network node 110 may interface with one or more network nodes over an internode interface. For example, network node 110 may interface with other network nodes over an X2 interface.

In certain embodiments, an area of wireless signal coverage associated with a network node 110 may be referred to as a cell. Thus, each network node 110 may have one or more cells associated with it. In the example of FIG. 1, a first wireless device 121A and a second wireless device 121B are located within cell 115. First wireless device 121A and second wireless device 121B may be configured to communicate within wireless communications network 100 via network node 110 over a first communication link (e.g., radio link 131, 132) when present in cell 115 served by network node 110. First wireless device 121A and second wireless device 121B may, for example, be any type of wireless device capable of communicating with network nodes 110 or another UE over radio signals. For example, first wireless device 121A and second wireless device 121B may be a wireless device with D2D capability, such as a mobile phone, a cellular phone, a Personal Digital Assistant (PDA), a smart phone, a tablet, a radio communication device, target device, low-cost and/or low-complexity UE, a sensor or actuator with wireless communication capabilities, a sensor or actuator connected to or equipped with a wireless device, a Machine Device (MD), a Machine-Type-Communication (MTC) device, a Machine-to-Machine (M2M) communication device, a Customer-Premises Equipment (CPE), a Laptop-Mounted Equipment (LME), a Laptop-Embedded Equipment (LEE), USB dongles, etc.

First wireless device 121A and second wireless device 121B may be capable of communicating with each other directly using wireless D2D communication over a second communication link (e.g., D2D communication link 140). Thus, first wireless device 121A and second wireless device 121B may be referred to as a D2D pair of wireless devices (i.e., one pair of wireless devices using D2D communication). The D2D communication between first wireless device 121A and second wireless device 121B may be so-called network-assisted D2D communication wherein network node 110 supports and controls the D2D communication between first wireless device 121A and second wireless device 121B. Alternatively, the D2D communication between first wireless device 121A and second wireless device 121B may be an ad-hoc mode D2D communication. That is, the D2D link 140 between first wireless device 121A and second wireless device 121B has been established and/or is controlled and maintained by one or both of first wireless device 121A and second wireless device 121B only. First wireless device 121A and second wireless device 121B may be capable of, and may be configured to, transmit and receive D2D data transmissions to or from each other using contention-based transmission resources of the same frequency in wireless communications network 100.

Example embodiments of wireless devices 121, network node 110, and other network nodes (such as a radio network controller or core network node) are described in more detail below with respect to FIGS. 6-10.

Although FIG. 1 illustrates a particular arrangement of a wireless communication network, the present disclosure contemplates that the various embodiments described herein may be applied to a variety of networks having any suitable configuration. For example, the network may include any suitable number of wireless devices 121 and network nodes 110, as well as any additional elements suitable to support communication between wireless devices or between a wireless device and another communication device (such as a landline telephone). Furthermore, although certain embodiments may be described as implemented in an LTE network, wireless communications network 100 may be any wireless or radio communication system, such as, for example, LTE-Advanced, Wideband Code-Division Multiple Access (WCDMA), Global System for Mobile communications/Enhanced Data rate for GSM Evolution (GSM/EDGE), Worldwide Interoperability for Microwave Access (WiMax), Ultra Mobile Broadband (UMB) or GSM network, or any other suitable cellular network or system.

The various embodiments described herein are applicable to single carrier as well as to multicarrier (MC) or carrier aggregation (CA) operation of wireless device 121 on WAN in conjunction with D2D operation on at least one sidelink. The sidelink(s) for D2D operation may be on any one or more serving cells of the UE 121 (for example, PCell, PSCell, SCell, etc.). The sidelink(s) may also be on a cell of a carrier only used for D2D operation (also known as ProSe carrier, ProSe dedicated carrier, ProSe preconfigured carrier etc.). The term carrier aggregation may be interchangeably referred to as "multi-carrier system", "multi-cell operation", "multi-carrier operation", "multi-carrier" transmission and/or reception.

Furthermore, although the various embodiments may be described in terms of WAN link 131, 132 as the first communication link and D2D communication link (or sidelink) 140 as the first communication link and second communication link, respectively, the various embodiments are not limited to such an example embodiment. The present disclosure contemplates that the various embodiments may be applied to any scenario in which a wireless device receives signals during overlapping time resources over two communication links.

Wireless communications network 100 described above may be arranged to operate within a licensed frequency spectrum (i.e., regulated and dedicated frequency bands in which a centralized network controls the wireless or radio communication according to a certain predetermined standard). However, recent developments have opened up to expand wireless communications network 100 to also operate in parts of the so-called unlicensed spectrum (i.e., unlicensed frequency bands which are shared, decentralized and not licensed to a particular type of scheduled wireless or radio communication). The spectrum may be interchangeably referred to herein as channel, radio channel, radio frequency resource, carrier frequency, carrier, frequency layer, etc. Examples of wireless technologies that today utilize the unlicensed spectrum may include Wi-Fi, Ultra Wideband, spread spectrum, software-defined radio, cognitive radio, and mesh networks. In the unlicensed spectrum, wireless devices of different wireless technologies compete with each other about having access to and transmitting on the transmission resources within the spectrum. Hence, the channel sharing of these transmission resources may be referred to as contention-based.

As described above, wireless devices 121A and 121B may be configured to receive signals over both a first communication link 131, 132 (which may be interchangeably referred to herein as WAN link 131, 132) and a second communication link 140 (which may be interchangeably referred to as D2D communication link 140 or sidelink 140) during at least partly overlapping time resources (i.e., resources partly overlapping in time). For example, wireless devices 121A and 121B may be configured to receive WAN signals on WAN DL and D2D signals on sidelink during at least partly overlapping time resources. Examples of a time resource include time slot, transmission time interval (TTI), subframe, symbol, frame, scheduling period, data and/or control channel reception time or instant, etc. Typically, a wireless device can be scheduled during each time resource (e.g., subframe), and therefore the wireless device generally monitors one or more control channels during each time resource for determining if the wireless device is scheduled or not. When scheduled, the wireless device also receives a data channel in the same or a different time resource.

Examples of WAN related control channels include the Physical Downlink Control Channel (PDCCH), Enhanced Physical Downlink Control Channel (E-PDCCH) (also known as ePDCCH), Physical Control Format Indicator Channel (PCFICH), Physical Hybrid ARQ Indicator Channel (PHICH), etc. On the WAN link, the wireless device may be scheduled with the data in DL (i.e., receives data) using one or more data channels (e.g., Physical Downlink Shared Channel (PDSCH)) from at least one serving cell. The wireless device may be scheduled data in DL (i.e., receives data) from one or more data channels, but at least one first data channel (e.g., PDSCH) from at least the first cell. Therefore, data reception corresponds to DL PDSCH demodulation in WAN in LTE.

Examples of sidelink related control channels are scheduling assignment (SA) for communication, and other semi-persistent allocation per UE specific basis given by the network for discovery or resources allocation for discovery signal transmitted on a non-UE specific basis and selected by the wireless device based on predefined rule. The wireless device is transmitted data (e.g, Physical Sidelink Shared Channel (PSSCH) or Physical Sidelink Discovery Channel (PSDCH)). Therefore, data reception corresponds to demodulation in sidelink in LTE.

In certain embodiments, network node 110 may determine whether a wireless device, such as wireless device 121A or 121B, is configured to receive signals over both a first communication link 131, 132 and a second communication link 140 during at least partly overlapping time resources. For example, network node 110 may determine if a first D2D capable UE, such as wireless device 121A, is configured to perform both D2D and WAN operations during overlapping time resource (e.g., in sidelink subframes and DL subframes over the same or partly overlapping time).

Network node 110 may determine whether wireless device 121A is configured to receive signals over both first communication link 131 and second communication link 140 in any suitable manner. For example, network node 110 may determine whether wireless device 121A is configured to receive signals over both first communication link 131 and second communication link 140 during at least partly overlapping time resources by retrieving a configuration for wireless device 121A. The retrieved configuration for wireless device 121A may be stored in memory of network node 110. As one example, the stored configuration for wireless device 121A may include information about requests by wireless device 121A asking network node 110 to assign resources for receiving WAN signals on DL and D2D signals on sidelink. Note that although the various embodiments may be described in particular with respect to wireless device 121A, they are equally applicable to wireless device 121B or any other wireless device 121 in wireless communication network 100 receiving signals over both a first communication link and a second communication link during at least partly overlapping time resources.

In some cases, network node 110 may receive capability information from wireless device 121A and/or from another network node or another UE (e.g., a second D2D capable UE such as wireless device 121B) which have such information. The received capability information may include information about one or more reception capabilities of wireless device 121A. The capability information may include any suitable information, such as information about maximum rates (e.g., data rates and/or data block sizes and/or transport formats) that the wireless device can receive on first communication link 131 (e.g., WAN DL) and on second communication link 140 (e.g., sidelink) during partly or fully overlapping time resources. In certain embodiments, the capability information may include one or more of: an indication of a maximum data rate for one or both of first communication link 131 and second communication link 140; an indication of a maximum data block size for one or both of first communication link 131 and second communication link 140; an indication of one or more adaptations to the one or more transmission parameters of one or both of first communication link 131 and second communication link 140; and one or more characteristics of a transport format supported by wireless device 121A.

In certain embodiments, network node 110 determines whether wireless device 121A has limited reception capability. For example, network node 110 may determine whether wireless device 121A has limited reception capability in terms of receiving WAN and D2D signals during at least the partly overlapping time resources. Network node 110 may determine whether the wireless device 121A has limited reception capability in any suitable manner. In certain embodiments, network node 110 may explicitly determine whether wireless device 121A has limited reception capability based on the reception capability information received from wireless device 121A and/or from another network node or another UE (e.g., a second D2D capable UE such as wireless device 121B) which has such information. For example, network node 110 may compare at least one of the reception capabilities included in the received capability information to one or more thresholds, and determine, based on the comparison of the at least one reception capability to the one or more thresholds, whether wireless device 121A has limited reception capability.

In certain embodiments, network node 110 may implicitly determine the capability of the wireless device 121A based on any suitable criteria. For example, the reception capability determination may be based on one or more of UE reception performance (such as UE data rate or UE throughput on WAN and D2D links over the previous time resources), statistics or historical results of the UE data rate or throughput, or any other suitable criteria. As another example, in certain embodiments network node 110 may determine whether wireless device 121A has limited reception capability based at least in part on a comparison of at least one reception capability of the wireless device to a threshold. In such a case, network node 110 may evaluate one or more reception capabilities of wireless device 121A related to reception of signals over first communication link 131 and second communication link 140 (e.g., WAN link and sidelink, respectively) and compare at least one of the reception capabilities of wireless device 121A to one or more thresholds. The reception capabilities may be any suitable information. For example, in certain embodiments the reception capability may be one or more of a data rate for one or both of first communication link 131 and second communication link 140 over one or more previous time resources and a data throughput for one or both of first communication link 131 and second communication link 140 over one or more previous time resources. For example, if the maximum rates that wireless device 121A can receive during partly or fully overlapping time resources on first communication link 131 (e.g., WAN) and/or second communication link 140 (e.g., sidelink) are below a first threshold and a second threshold, respectively, then network node 110 may assume that wireless device 121A has limited reception capability in terms of receiving WAN and D2D signals.

In certain embodiments, upon determining that wireless device 121A is configured to receive signals over both first communication link 131 and second communication link 140 during at least partly overlapping time resources and that wireless device 121A has limited reception capability, network node 110 adapts one or more transmission parameters of one or both of first communication link 131 (e.g., WAN link) and second communication link 140 (e.g., sidelink). Network node 110 may adapt the one or more transmission parameters in any suitable manner and using any suitable operations. In some cases, network node 110 may adapt WAN and/or D2D data rates. For example, network node 110 may adapt the assigned resources or resources to be assigned to wireless device 121A for WAN and/or D2D reception (e.g., subframes on sidelink) during at least partly overlapping time resources. This may advantageously enable wireless device 121A to achieve certain WAN and D2D data rates (e.g., D2D and WAN data rates above their respective thresholds). As another example, network node 110 may adapt a data rate or an assignment of resources. The adaptation may comprise any suitable operations, and network node 110 may apply one or combination of adaptations. Examples of the various adaptations that may be made are described in more detail below.

As a first example, in certain embodiments network node 110 may adapt a data rate or an assignment of resources by adjusting a transport format (TF) of first communication link 131 (e.g., WAN link) and/or second communication link 140 (e.g., sidelink) to enable wireless device 121A (which has limited reception capabilities) to modify the data rate on WAN link and/or on sidelink. For example, network node 110 may adjust a TF on the WAN link 131 to enable wireless device 121A to use less memory and/or processor resources in WAN link 131, and use more resources for receiving D2D on sidelink 140 to increase the D2D data rate. One example of adjusting the TF is to use a smaller transport block (TB). When a smaller TB is used, the size of soft buffer required for WAN reception is scaled down (i.e., buffer size is decreased). Another example of adjusting the TF is to use a more robust TF on WAN link 131 (e.g, a lower code rate such as ⅓ instead of ¾), lower order modulation (such as QPSK instead of 16 QAM or 64 QAM), and less retransmissions. When a robust TF is used on WAN link 131, fewer retransmissions are needed. Hence, wireless device 121A does not need to allocate soft buffer for each HARQ process. Several WAN HARQ processes may share the same soft buffer, thereby reducing the memory and/or processor resources for the reception of WAN. Another example of adjusting the TF is to reduce the number of physical channels (e.g., Resource Blocks (RBs), Physical Resource Blocks (PRBs), Virtual Resource Blocks (VRBs), resource elements, etc.) used for first communication link 131 (i.e., WAN) to enable wireless device 121A to use fewer resources for receiving signals over first communication link 131. When fewer channels (e.g., 4 PRBs instead of 10 PRBs) are used, less memory and/or processor resources are needed to store and process the raw frequency domain data. The remaining or available resources can be used by the UE for D2D reception on second communication link 140.

As a second example, in certain embodiments network node 110 may adapt a data rate or an assignment of resources by limiting the maximum number of HARQ processes to enable wireless device 121A to release some buffer or memory resources used for WAN HARQ process to enhance D2D reception, thus increasing D2D data rate. The soft buffer needed by wireless device 121A is scaled up (i.e., buffer size needs to be increased) by the number of HARQ processes. On the other hand, if the number of HARQ processes is reduced then the soft buffer needed by the reception can be reduced significantly.

As a third example, in certain embodiments network node 110 may adapt a data rate or an assignment of resources by increasing the number of time resources used for receiving signals over second communication link 140. Network node 110 may increase the number of time resources (e.g., subframes) on sidelink (e.g., by factor of 2) to enable wireless device 121A to use less or fewer time resources for receiving WAN on DL to increase D2D data rate in case the D2D data rate has fallen or is expected to fall below a threshold.

As a fourth example, network node 110 may use the data rate adaptation schemes described above in the first, second, and third examples in one or a few time resources every N time resources (such as subframes every N subframes, e.g., 2 subframes every 40 or 80 ms).

In some cases, network node 110 may send an indicator to wireless device 121A to inform wireless device 121A of the one or more adaptations to one or more transmission parameters of one or both of first communication link 131 and second communication link 140. For example, network node 110 may send an indication of the restriction of data rate or assignment of resources, such as, for example, TF and/or the limitation of the maximum number of HARQ processes for WAN and/or D2D operation. The indicator may include any suitable information. For example, the information may include the time interval during which the restriction and/or the limitation will be applied. In another example, the indicator may include information indicating the start and/or stop of the restriction and/or limitation for the related parameters (e.g., TF, TB size, RBs, etc.).

In certain embodiments, network node 110 may determine whether wireless device 121A is using or intends to use a data rate on first communication link 131 (e.g., WAN link) above a first threshold and determine whether wireless device 121A is using or intends to use a data rate on second communication link 140 (e.g., D2D communication link) above a second threshold. The present disclosure contemplates that the first threshold and second threshold may have any suitable value, and may vary according to particular applications. In certain embodiments, the first and second thresholds may be pre-configured or dynamically defined. Based on this determination, network node 110 may further adapt the assigned resources or the resources being assigned to wireless device 121A for WAN and/or D2D receptions (e.g., WAN TF and/or D2D resources) as described above in Examples 1-4.

Network node 110 may determine whether wireless device 121A is using or intends to use a data rate on first communication link 131 above a first threshold in any suitable manner. As a first example, network node 110 may determine whether wireless device 121A is using or intends to use a data rate on first communication link 131 (e.g., WAN link) above a first threshold by determining an amount of data for wireless device 121A in a buffer of network node 110.

Network node 110 may determine whether wireless device 121A is using or intends to use a data rate on second communication link 140 (e.g., sidelink) above a second threshold in any suitable manner. As a first example, network node 110 may determine whether wireless device 121A is using or intends to use a data rate on second communication link 140 above a second threshold by detecting (e.g., decoding on UL subframes in the BS) reception of one or more uplink (UL) subframes by one or more other wireless device over sidelink 140. For example, if there are transmissions from other D2D UEs (e.g., a second D2D capable UE such as wireless device 121B) in certain subframes in sidelink, then these are likely to be received by the first D2D capable UE (i.e., wireless device 121A) on sidelink 140.

As a second example, network node 110 may receive an explicit indication from wireless device 121A that wireless device 121A is receiving D2D signals. In such a case, network node 110 may receive an indication from wireless device 121A that wireless device 121A is receiving signals over second communication link 140 (e.g., sidelink).

As a third example, network node 110 may receive an indication that wireless device 121A has limited reception capabilities. In some cases, network node 110 may receive an explicit indication from wireless device 121A about its limited capability. For example, wireless device 121A may inform network node 110 about one or more of the following: a maximum data rate while receiving signals over both first communication link 131 (e.g., WAN link) and second communication link 140 (e.g., sidelink); a maximum size of the soft buffer that can be supported at the same time period or partly overlapping time period when wireless device 121A is receiving signals over both first communication link 131 and second communication link 140; a preferred transport format for first communication link 131; and a preferred or a maximum number of HARQ processes.

As a fourth example, network node 110 may receive an indication that wireless device 121A is capable of using soft combining for receiving signals over second communication link 140 (e.g., sidelink). Network node 110 may also determine based on the first, second, or third examples described above that wireless device 121A is using soft combining for receiving D2D signals (e.g., 2-4 retransmitted identical packets which the first D2D UE can soft combine to improve the chances of correct decoding of the data/transport block).

In some cases, network node 110 may inform wireless device 121A about the adaptation of resources to be assigned or being assigned. Based on this, wireless device 121A may further adapt its receiver resources for receiving WAN and/or D2D signals during at least partly overlapping time resources.

In addition to the adaptations performed by network node 110, in certain embodiments a D2D capable UE, such as wireless device 121A and 121B, may adapt one or more procedures related to reception of signals over one or both of first communication link 131 (e.g., WAN link) and second communication link 140 (e.g., sidelink). For example, wireless device 121A may determine that wireless device 121A is configured to receive signals over both first communication link 131 and second communication link 140 during at least partly overlapping time resources (e.g., in subframes on sidelink and DL subframes over the same or at least partly overlapping in time).

Wireless device 121A may determine a status of at least one of a memory resource and a processor resource of wireless device 121A for signals received over both first communication link 131 and second communication link 140. For example, wireless device 121A may determine the status of its memory and/or processor resources, which wireless device 121A has to share for receiving, storing and processing the WAN signals on WAN DL and D2D signals on sidelink.

In some cases, wireless device 121A may optionally receive from network node 110 (or another network node) an indication or information about an adaptation of one or more transmission parameters of one or both of first communication link 131 and second communication link 140 by network node 110. For example, wireless device 121A may receive an indication or information about the restriction of WAN and/or D2D data rates or assigned resources, which is applied or being applied by network node 110 (e.g., TF and/or the limitation of the maximum number of HARQ processes for WAN and/or D2D operation).

In certain embodiments, wireless device 121A adapts one or more procedures related to reception of signals over one or both of first communication link 131 and second communication link 140 based at least in part on the determined status of at least one of a memory resource and a processor resource of wireless device 121A. In some cases, wireless device 121A may adapt the one or more procedures related to reception of signals over one or both of first communication link 131 and second communication link 140 further based at least in part on the information received about the adaptation of one or more transmission parameters by network node 110.

Wireless device 121A may adapt the one or more procedures related to reception of signals over one or both of first communication link 131 and second communication link 140 in any suitable manner. In some cases, wireless device 121A may modify one or more parameters related to one or more reception algorithms used by a receiver of wireless device 121A. This may ensure that wireless device 121A is able to receive both WAN and D2D signals during at least partly overlapping time resources. In certain embodiments, wireless device 121A may combine fewer retransmissions, select fewer processes to monitor on one of first communication link 131 and second communication link 140, and/or modifying a first portion of a buffer associated with first communication link 131 and a second portion of the buffer associated with second communication link 140. Examples of such adaptations in wireless device 121A are described in more detail below.

As a first example, wireless device 121A may determine, based on the received information about adaptation of one or more transmission parameters of network node 110, that additional memory and/or processor resources are available for signals received over second communication link 140 (e.g., sidelink). Wireless device 121A may use the extra memory and/or processor resources for soft combining of 2 or more retransmissions in case more memory and/or processer resources can be obtained due to network node adaptive adjustment and/or limitation. Otherwise, wireless device 121A may consider less soft combining (i.e., combine fewer retransmissions) in case the memory and/or processor resources are not enough.

As a second example, wireless device 121A may determine, based on the received information about adaptation of one or more transmission parameters of network node 110, that additional memory and/or processor resources are available for signals received over second communication link 140 (e.g., sidelink). Wireless device 121A may monitor additional processes over second communication link 140. For example, wireless device 121A may monitor more sidelink processes in the same TTI in case more memory and/or processor resources can be obtained for D2D communication due to network adaptive adjustment to allow more resources for D2D. This in turn may improve the monitoring efficiency of signals received on sidelink 140 (e.g., D2D signals can be received with less soft combining). Otherwise, wireless device 121A may select fewer sidelink processes to monitor the D2D signals. In certain embodiments, the selection may be based on some prioritization rule. The present disclosure contemplates that the selection may be based on any suitable prioritization rule. The prioritization rule may be predefined, or it may be decided by wireless device 121A itself. In one example of the selection, for D2D communication, wireless device 121A may select more sidelink processes with fewer bits in a transport block received on sidelink. Such a rule may also be pre-defined in the standard.

As a third example, one or more pre-defined rules may be implicitly realized in wireless device 121A by virtue of pre-defined UE requirements, such as, for example, a UE demodulation requirement to verify UE throughput for D2D and WAN receptions on sidelink. Examples of pre-defined requirements adaptation between WAN and D2D receptions are described in more detail below.

In certain embodiments, the UE pre-defined requirements (e.g., UE demodulation requirements) may require wireless device 121A to meet a certain throughput value (e.g., 70% of the maximum value) under certain radio conditions (e.g., fading with 5 Hz of Doppler) and for transmission data comprising of certain TF (e.g., transport block size). This may be required in order to verify that wireless device 121A is able to adapt one or more procedures (e.g., receiver algorithm, sharing of buffer size between D2D and WAN signals, etc.) in order to receive both WAN and D2D signals during at least partly overlapping time resources. To illustrate, consider the following example of UE requirements that may be pre-defined in the standard.

In a first step, wireless device 121A (i.e., a first D2D capable UE) is first configured (e.g., during time period T1) to receive during at least partly overlapping time resources (e.g., at least partly overlapping WAN and D2D subframes) WAN signals transmitted to wireless device 121A using a first WAN TF comprising at least a first WAN TB size (i.e., first WAN TBS) that is below a first WAN TBS threshold, and to receive D2D signals transmitted to wireless device 121A using a first D2D TF comprising at least a first D2D TB size (i.e. first D2D TBS) which is above a first D2D TBS threshold.

In a second step, after T1 wireless device 121A is configured (e.g., during time period T2) to receive during at least the partly overlapping time resources (e.g., at least partly overlapping WAN and D2D subframes), WAN signals transmitted to wireless device 121A using a second WAN transport format comprising of at least a second WAN TB size (i.e., second WAN TBS) which is above the first WAN TBS threshold, and D2D signal transmitted to wireless device 121A using a second D2D transport format comprising of at least a second D2D transport block size (i.e., second D2D TBS) which is below the first D2D TBS threshold.

In both the first and second steps above, wireless device 121A is verified to receive at least certain minimum pre-defined data rates (e.g., throughput) for both WAN and D2D (e.g., WAN rate 1 and D2D rate 1 during T1 and WAN rate 2 and D2D rate 2 during T2). This may require wireless device 121A to adapt one or more procedures, such as, for example, sharing of internal resources such as memory, processors, etc.

Figure 2:
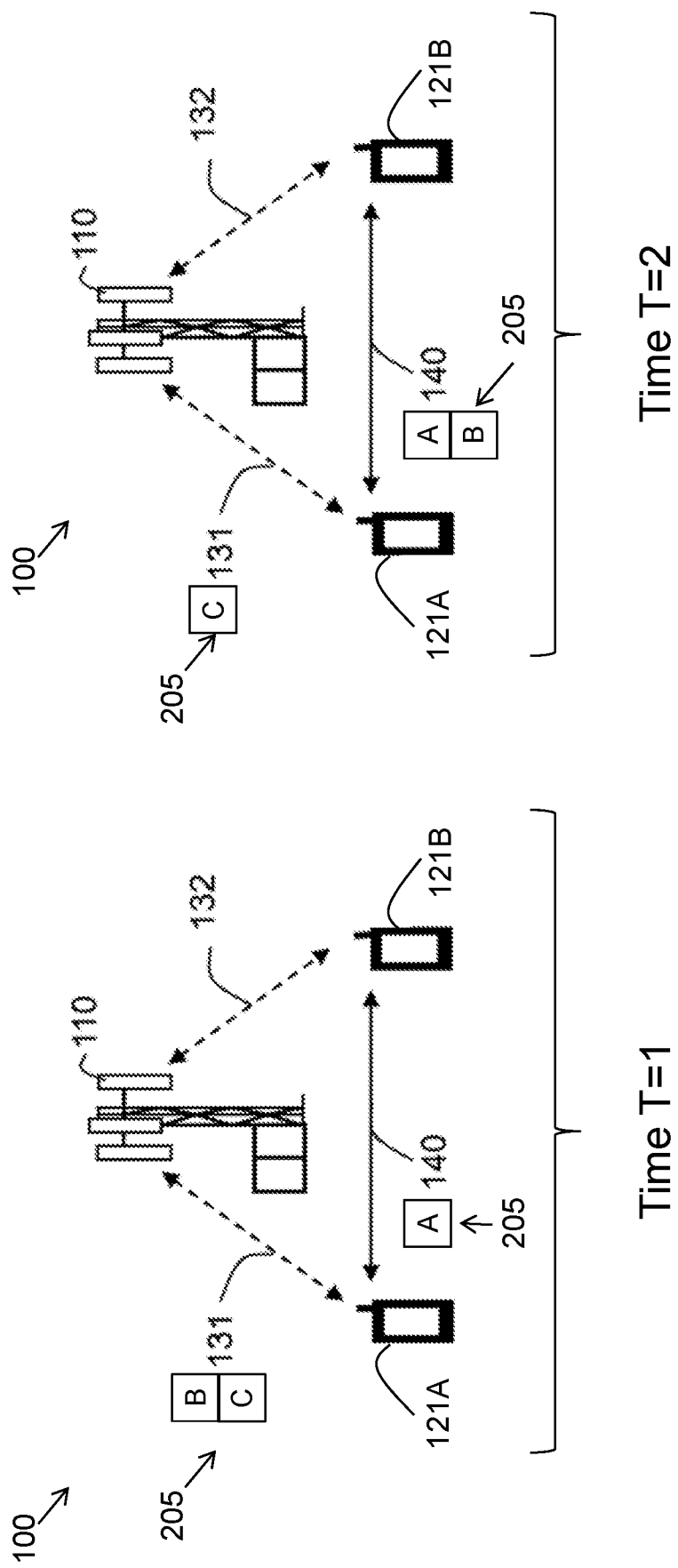
FIG. 2 illustrates an example of adapting one or more transmission parameters by a network node, in accordance with certain embodiments.

FIG. 2 illustrates an example of adapting one or more transmission parameters by a network node, in accordance with certain embodiments. FIG. 2 is similar to FIG. 1 described above in that it illustrates wireless communications network 100, including one or more network node(s) 110 and multiple wireless devices (described in more detail above with respect to FIG. 1 and below in relation to FIGS. 6-10), including wireless device 121A (which may be interchangeably referred to as a first UE or a first D2D capable UE) and second wireless device 121B (which may be interchangeably referred to as a second UE or a second D2D capable UE).

As described above, wireless device 121A and wireless device 121B may be configured to communicate within wireless communications network 100 via network node 110 over a radio link 131 and 132, respectively, when present in a cell served by network node 110. Wireless device 121A and wireless device 121B may be capable of communicating with each other directly using D2D communication over D2D communication link 140 (e.g., sidelink). Thus, wireless device 121A and wireless device 121B may be referred to as a D2D pair of wireless devices (i.e., one pair of wireless devices using D2D communication). Wireless device 121A and wireless device 121B may be capable of, and may be configured to, transmit and receive D2D data transmissions to or from each other using contention-based transmission resources of the same frequency in wireless communications network 100.

FIG. 2 further illustrates wireless communications network 100 at two points in time, specifically time T=1 and time T=2. As described above, network node 110 may determine whether a wireless device, such as wireless device 121A, is configured to receive signals over both first communication link 131 and second communication link 140 during at least partly overlapping time resources. For example, wireless devices 121A and 121B may be configured to receive WAN signals on WAN DL 131 and D2D signals on sidelink 140 during at least partly overlapping time resources. Examples of a time resource include time slot, transmission time interval (TTI), subframe, symbol, frame, scheduling period, data and/or control channel reception time or instant, etc. Thus, in the example of FIG. 2 time T=1 may represent a first subframe, and Time T=2 may represent a second subframe.

At time T=1 wireless device 121A may be receiving signals over first communication link 131 (e.g., WAN link) and over second communication link 140 (e.g., sidelink). This is represented in FIG. 2 using blocks 205A, 205B, and 205C. As used in FIG. 2, blocks 205A-C represent one or more transmission parameters of one or both of first communication link 131 and second communication link 140. For example, blocks 205A-C could be representative of one or more parameters of a transport format, including transport blocks, the number of physical channels, or any other suitable transmission parameters. At time T=1, wireless device 121A is receiving transport blocks 205B and 205C over first communication link 131, and is receiving transport block 205A over second communication link 140.

As described above in relation to FIG. 1, upon determining that wireless device 121A is configured to receive signals over both first communication link 131 and second communication link 140 during at least partly overlapping time resources and that wireless device 121A has limited reception capability, network node 110 may adapt one or more transmission parameters of one or both of first communication link 131 and second communication link 140. The result of such an example adaptation of one or more transmission parameters is shown in FIG. 2 at time T=2. As can be seen from FIG. 2, network node 110 has adjusted the TF of first communication link 131 and second communication link 140 to enable wireless device 121A to use fewer resources for receiving signals over first communication link 131. Instead of receiving transport blocks 205B and 205C over first communication link 131, wireless device 121A at time T=2 receives only transport block 205C over first communication link 131. Also, instead of receiving only transport block 205A over second communication link 140, wireless device 121A at time T=2 receives transport blocks 205A and 205B. The adjustments by network node 110 shown in the example of FIG. 2 may advantageously allow wireless device 121A to use less memory and/or processor resources in first communication link 131 (e.g., WAN link), and use more resources for receiving D2D communication on second communication link 140 (e.g., sidelink) to increase the D2D data rate.

Figure 3:
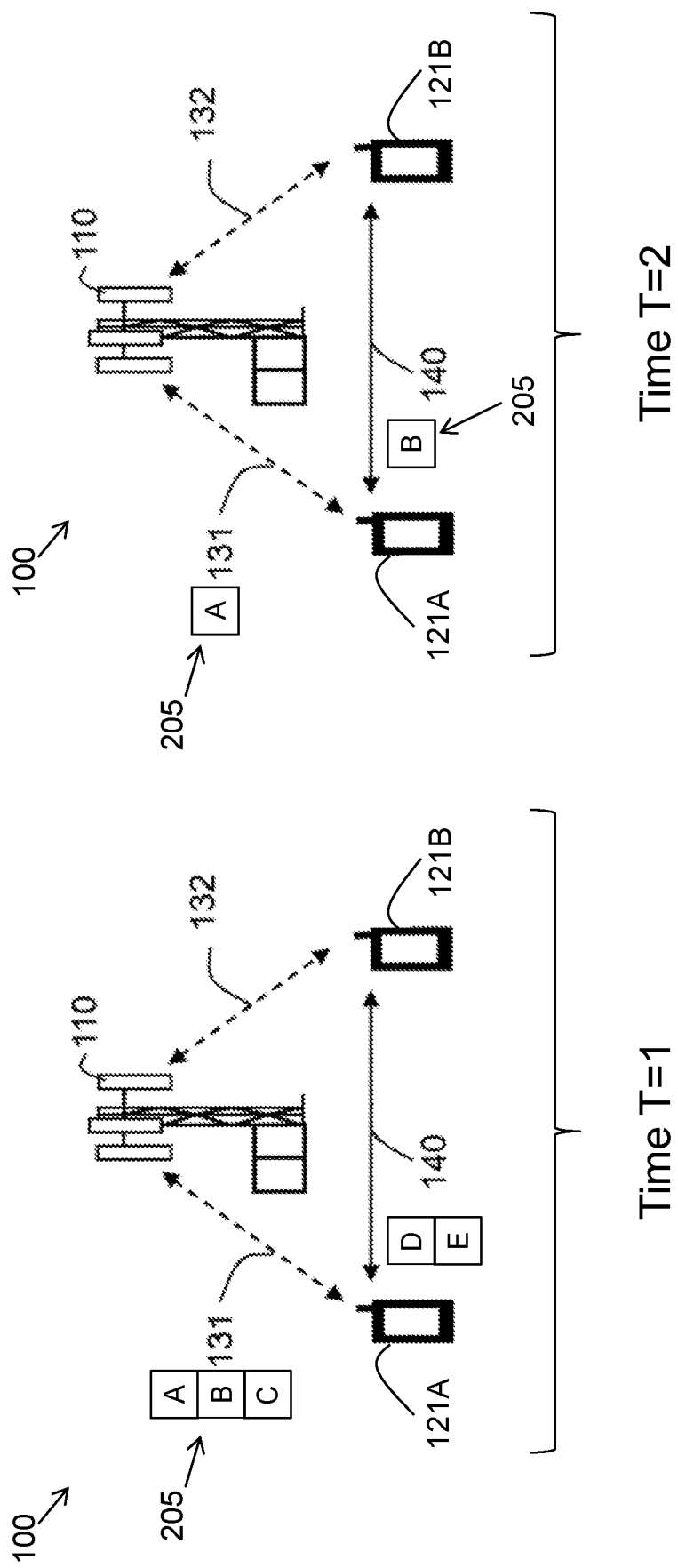
FIG. 3 illustrates another example of adapting one or more transmission parameters by a network node, in accordance with certain embodiments.

FIG. 3 illustrates another example of adapting one or more transmission parameters by a network node, in accordance with certain embodiments. FIG. 3 is similar to FIG. 2 in that FIG. 3 illustrates wireless communications network 100 at two points in time, specifically time T=1 and time T=2. Like FIG. 2, wireless communications network 100 shown in FIG. 3 includes one or more network node(s) 110 and multiple wireless devices (described in more detail above with respect to FIG. 1 and below in relation to FIGS. 6-10). As described above, network node 110 may determine whether a wireless device, such as wireless device 121A, is configured to receive signals over both first communication link 131 and second communication link 140 during at least partly overlapping time resources. For example, wireless devices 121A and 121B may be configured to receive WAN signals on WAN DL 131 and D2D signals on sidelink 140 during at least partly overlapping time resources. Examples of a time resource include time slot, transmission time interval (TTI), subframe, symbol, frame, scheduling period, data and/or control channel reception time or instant, etc. Thus, in the example of FIG. 3 time T=1 may represent a first subframe, and time T=2 may represent a second subframe.

At time T=1, wireless device 121A may be receiving signals over first communication link 131 (e.g., WAN link) and over second communication link 140 (e.g., sidelink). This is represented in FIG. 3 using blocks 205A, 205B, 205C, 205D, and 205E. As used in FIG. 3, blocks 205A-E represent one or more transmission parameters of one or both of first communication link 131 and second communication link 140. For example, blocks 205A-E could be representative of one or more parameters of a transport format, including transport blocks, the number of physical channels, or any other suitable transmission parameters. At time T=1, wireless device 121A is receiving transport blocks 205A, 205B, and 205C over first communication link 131, and is receiving transport blocks 205D and 205E over second communication link 140.

As described above in relation to FIG. 1, upon determining that wireless device 121A is configured to receive signals over both first communication link 131 and second communication link 140 during at least partly overlapping time resources and that wireless device 121A has limited reception capability, network node 110 may adapt one or more transmission parameters of one or both of first communication link 131 and second communication link 140. The result of such an example adaptation of one or more transmission parameters is shown at time T=2. As can be seen from FIG. 3, network node 110 has adjusted the transport format of first communication link 131 and second communication link 140 to enable wireless device 121A to use fewer resources for receiving signals over first communication link 131 and second communication link 140. At time T=2, instead of receiving transport blocks 205A-C over first communication link 131, wireless device 121A at time T=2 receives only transport block 205A over first communication link 131. Also, instead of receiving transport blocks 205D and 205E over second communication link 140, wireless device 121A at time T=2 receives only transport block 205B. The adjustments by network node 110 shown in the example of FIG. 3 may advantageously allow wireless device 121A to use less memory and/or processor resources in first communication link 131 (e.g., WAN link), and use more resources for receiving D2D on the second communication link 140 (e.g., sidelink) to increase the D2D data rate.

Figure 4:
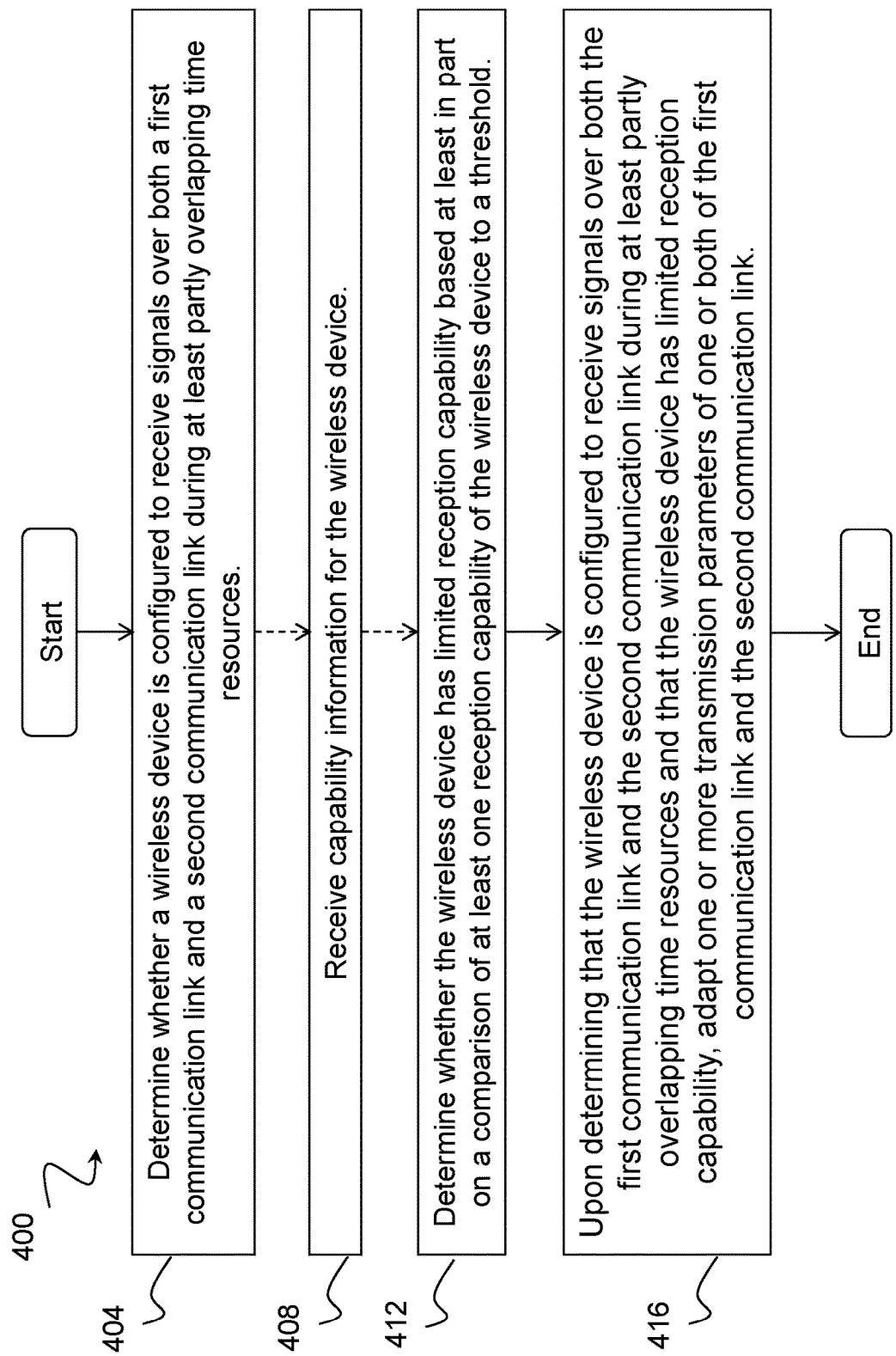
FIG. 4 is a flow chart of a method in a network node, in accordance with an embodiment.

FIG. 4 is a flow chart of a method 400 in a network node, in accordance with an embodiment. The method begins at step 404, where the network node determines whether a wireless device is configured to receive signals over both a first communication link and a second communication link during at least partly overlapping time resources. In certain embodiments, the first communication link may comprise a wide area network communication link and the second communication link may comprise a device-to-device communication link. The wireless device may comprise a device-to-device capable wireless device. In certain embodiments, determining whether the wireless device is configured to receive signals over both the first communication link and the second communication link during at least partly overlapping time resources may comprise retrieving a configuration for the wireless device from a memory of the network node.

Optionally, the method proceeds to step 408, where the network node may receive capability information. In certain embodiments, the received capability information may comprise one or more reception capabilities of the wireless device. The one or more reception capabilities may comprise one or more of: an indication of a maximum data rate for one or both of the first communication link and the second communication link; an indication of a maximum data block size for one or both of the first communication link and the second communication link; an indication of one or more adaptations to the one or more transmission parameters of one or both of the first communication link and the second communication link; and one or more characteristics of a transport format supported by the wireless device.

At step 412, the network node determines whether the wireless device has limited reception capability based at least in part on a comparison of at least one reception capability of the wireless device to a threshold. In certain embodiments, the network node may determine whether the wireless device has limited reception capability by comparing at least one of the one or more reception capabilities of the received capability information to one or more thresholds, and determining, based on the comparison of the at least one reception capability to the one or more thresholds, whether the wireless device has limited reception capability. In certain embodiments, the network node may determine whether the wireless device has limited reception capability by evaluating one or more reception capabilities of the wireless device related to reception of signals over the first communication link and the second communication link, and comparing at least one of the one or more reception capabilities of the wireless device to one or more thresholds. In certain embodiments, the one or more reception capabilities may comprise one or more of: a data rate for one or both of the first communication link and the second communication link over one or more previous time resources; and a data throughput for one or both of the first communication link and the second communication link over one or more previous time resources.

At step 416, upon determining that the wireless device is configured to receive signals over both the first communication link and the second communication link during at least partly overlapping time resources and that the wireless device has limited reception capability, the network node adapts one or more transmission parameters of one or both of the first communication link and the second communication link. In certain embodiments, adapting one or more transmission parameters of one or both of the first communication link and the second communication link may comprise one or more of: adjusting a transport format of the first communication link to enable the wireless device to use fewer resources for receiving signals over the first communication link; reducing a number of physical channels used for the first communication link to enable the wireless device to use fewer resources for receiving signals over the first communication link; limiting a maximum number of hybrid-acknowledgement repeat request processes used for the first communication link; and increasing a number of time resources used for receiving signals over the second communication link. In certain embodiments, the method may comprise communicating to the wireless device an indication of one or more adaptations to the one or more transmission parameters of one or both of the first communication link and the second communication link.

In some cases, the method may comprise determining whether the wireless device is using or intends to use a data rate on the first communication link above a first threshold, and determining whether the wireless device is using or intends to use a data rate on the second communication link above a second threshold. In such a case, adapting one or more transmission parameters of one or both of the first communication link and the second communication link may be based at least in part on whether the data rate on the first communication link is determined to be above the first threshold and whether the data rate on the second communication link is determined to be above the second threshold. In certain embodiments, determining whether the wireless device is using or intends to use a data rate on the first communication link above a first threshold may comprise determining an amount of data for the wireless device in a buffer of the network node. Determining whether the wireless device is using or intends to use a data rate on the second communication link above a second threshold may comprise one or more of: detecting reception of one or more uplink subframes by one or more other wireless devices over the second communication link; receiving an indication from the wireless device that the wireless device is receiving signals over the second communication link; receiving an indication that the wireless device is capable of using soft combining for receiving signals over the second communication link; and receiving an indication from the wireless device that the wireless device has limited reception capabilities in terms of one or more of: a maximum data rate while receiving signals over both the first communication link and the second communication link; a maximum size of a soft buffer that can be supported while the wireless device is receiving signals over both the first communication link and the second communication link; a preferred transport format for the first communication link; and a preferred or a maximum number of HARQ processes.

Figure 5:
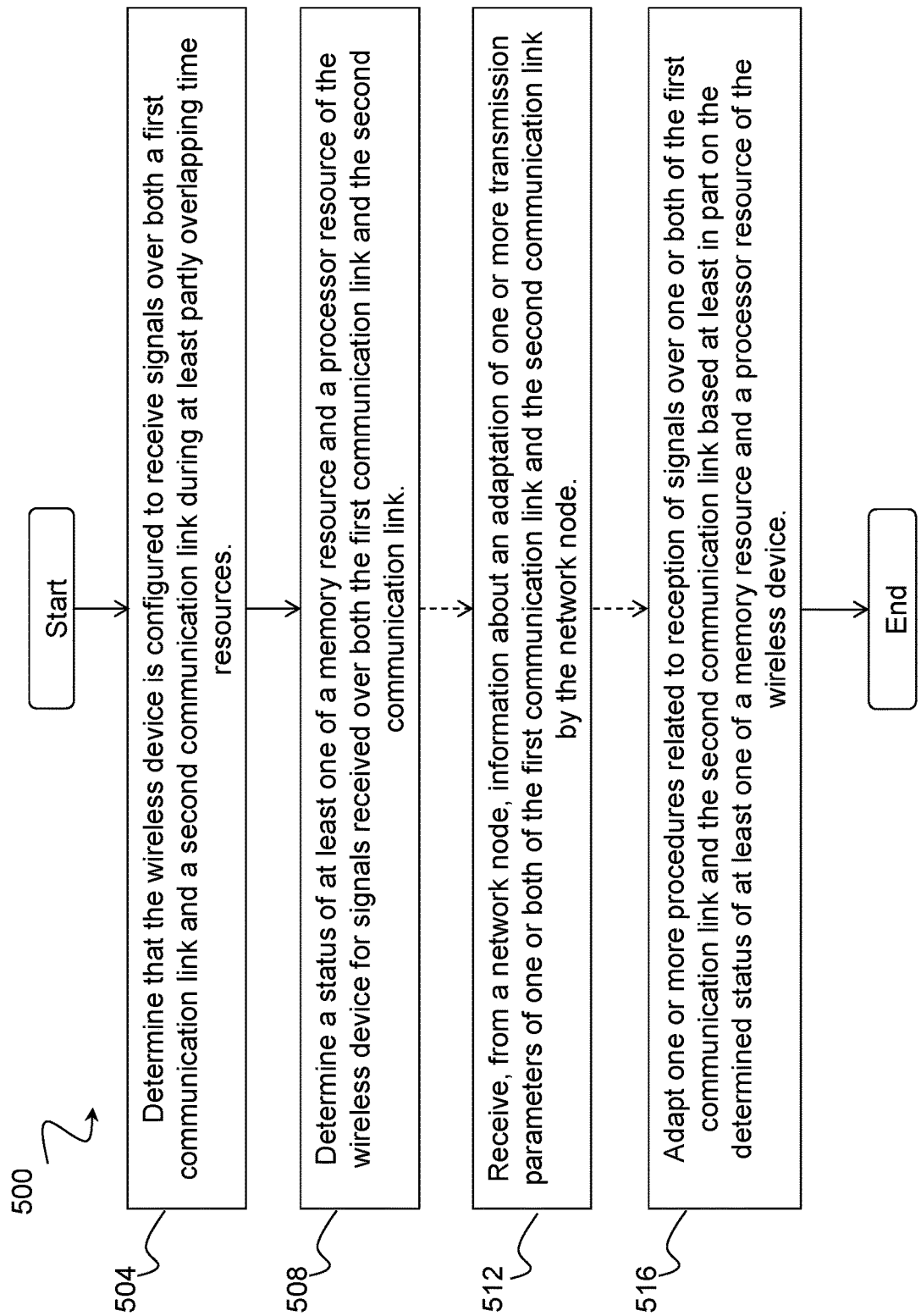
FIG. 5 is a flow chart of a method in a wireless device, in accordance with an embodiment.

FIG. 5 is a flow chart of a method 500 in a wireless device, in accordance with an embodiment. The method begins at step 504, where the wireless device determines that the wireless device is configured to receive signals over both a first communication link and a second communication link during at least partly overlapping time resources. In certain embodiments, the first communication link may be a wide area network communication link and the second communication link may be a device-to-device communication link. In certain embodiments, the wireless device comprises a device-to-device capable wireless device.

At step 508, the wireless device determines a status of at least one of a memory resource and a processor resource of the wireless device for signals received over both the first communication link and the second communication link. Optionally, at step 512, the wireless device receives, from a network node, information about an adaptation of one or more transmission parameters of one or both of the first communication link and the second communication link by the network node.

At step 516, the wireless device adapts one or more procedures related to reception of signals over one or both of the first communication link and the second communication link based at least in part on the determined status of the at least one of a memory resource and a processor resource of the wireless device. In certain embodiments, adapting one or more procedures related to reception of signals over one or both of the first communication link and the second communication link may be further based at least in part on the received information about the adaptation of one or more transmission parameters by the network node. In certain embodiments, adapting one or more procedures related to reception of signals over one or both of the first communication link and the second communication link based at least in part on the determined status of at least one of the wireless device's memory and processor resources may comprise one or more of: modifying one or more parameters related to a reception algorithm used by a receiver of the wireless device; combining fewer retransmissions; selecting fewer processes to monitor on one of the first communication link and the second communication link; and modifying a first portion of a buffer associated with the first communication link and a second portion of the buffer associated with the second communication link.

In certain embodiments, the method may comprise determining, based on the received information about the adaptation of one or more transmission parameters by the network node, that additional memory and processor resources are available for signals received over the second communication link; and using the additional memory and processor resources available for signals received over the second communication link for one or more of: soft combining a plurality of retransmissions over the second communication link; and monitoring additional processes over the second communication link.

In certain embodiments, the method may comprise communicating capability information for the wireless device to a network node. The communicated capability information may comprise one or more of: an indication of a maximum data rate for one or both of the first communication link and the second communication link; an indication of a maximum data block size for one or both of the first communication link and the second communication link; an indication of one or more adaptations to the one or more transmission parameters of one or both of the first communication link and the second communication link; and one or more characteristics of a transport format supported by the wireless device.

Figure 6:
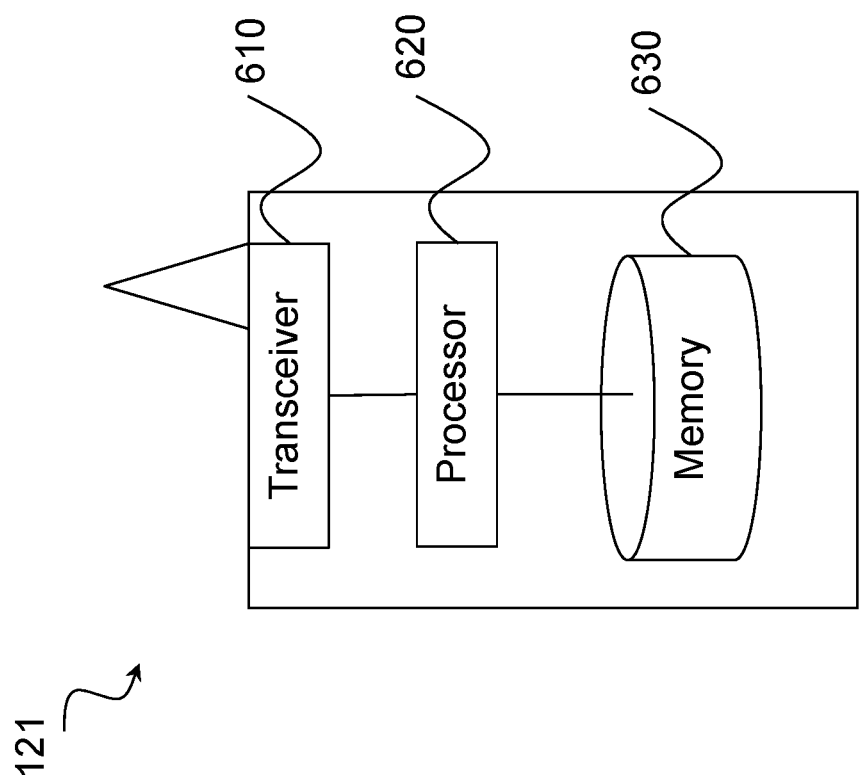
FIG. 6 is a block schematic of an exemplary wireless device, in accordance with certain embodiments.

FIG. 6 is a block schematic of an exemplary wireless device, in accordance with certain embodiments. Wireless device 121 may refer to any type of wireless device communicating with a node and/or with another wireless device in a cellular or mobile communication system. Examples of wireless device 121 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 121 may also be referred to as UE, a station (STA), a device, or a terminal in some embodiments. Wireless device 121 includes transceiver 610, processor 620, and memory 630. In some embodiments, transceiver 610 facilitates transmitting wireless signals to and receiving wireless signals from network node 110 (e.g., via an antenna), processor 620 executes instructions to provide some or all of the functionality described above as being provided by wireless device 121, and memory 630 stores the instructions executed by processor 620.

Processor 620 may include any suitable combination of hardware and software implemented in one or more modules to execute instructions and manipulate data to perform some or all of the described functions of wireless device 121, such as the functions of wireless device 121 described above in relation to FIGS. 1-5. In some embodiments, processor 620 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 630 is generally operable to store instructions, such as a computer program, software, an application including one or more of logic, rules, algorithms, code, tables, etc. and/or other instructions capable of being executed by a processor. Examples of memory 630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processor 620.

Other embodiments of wireless device 121 may include additional components beyond those shown in FIG. 6 that may be responsible for providing certain aspects of the wireless device's functionality, including any of the functionality described above and/or any additional functionality (including any functionality necessary to support the solution described above). As just one example, wireless device 121 may include input devices and circuits, output devices, and one or more synchronization units or circuits, which may be part of the processor 620. Input devices include mechanisms for entry of data into wireless device 121. For example, input devices may include input mechanisms, such as a microphone, input elements, a display, etc. Output devices may include mechanisms for outputting data in audio, video and/or hard copy format. For example, output devices may include a speaker, a display, etc.

Figure 7:
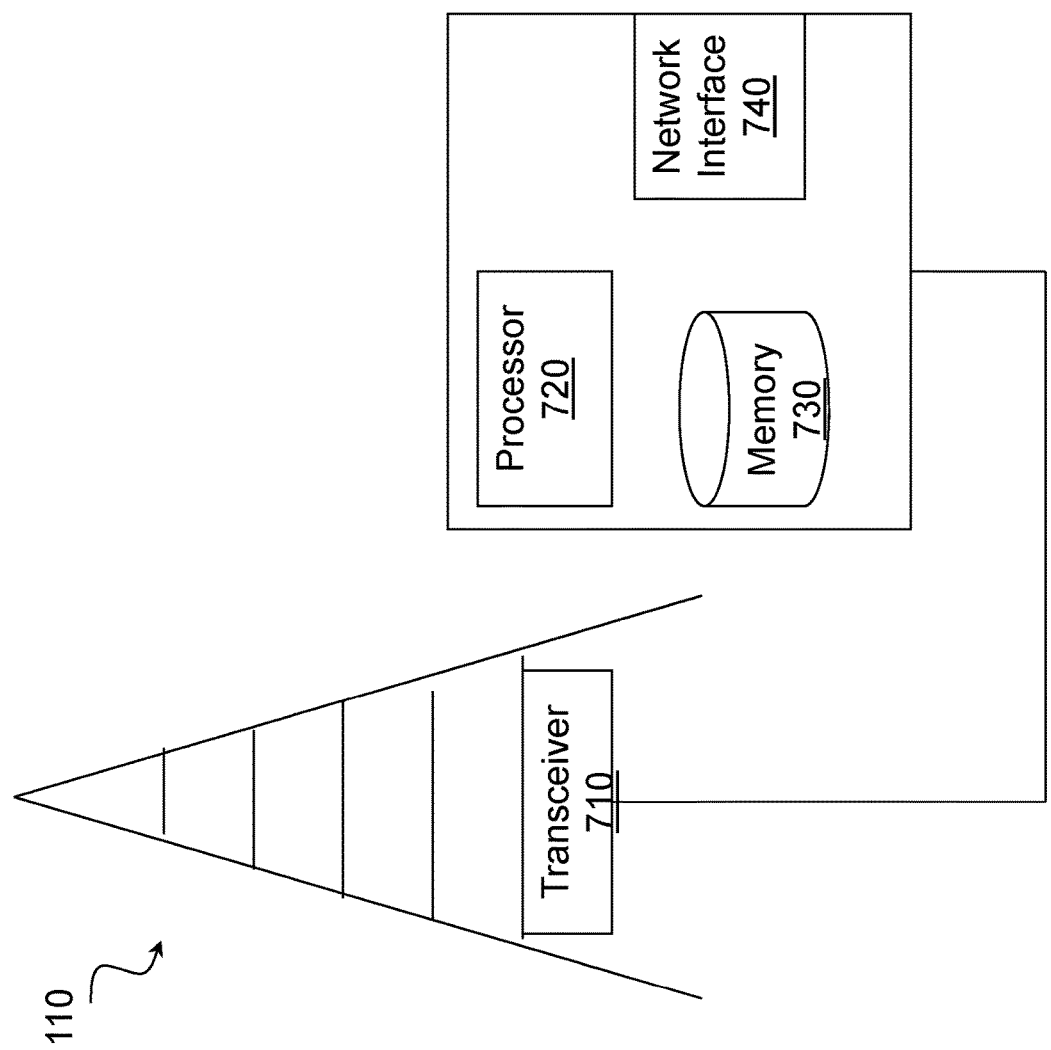
FIG. 7 is a block schematic of an exemplary network node, in accordance with certain embodiments.

FIG. 7 is a block schematic of an exemplary network node, in accordance with certain embodiments. Network node 110 may be any type of radio network node or any network node that communicates with a UE and/or with another network node. Examples of network node 110 include an eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 110 may be deployed throughout network 100 as a homogenous deployment, heterogeneous deployment, or mixed deployment. A homogeneous deployment may generally describe a deployment made up of the same (or similar) type of network nodes 110 and/or similar coverage and cell sizes and inter-site distances. A heterogeneous deployment may generally describe deployments using a variety of types of network nodes 110 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 110 may include one or more of transceiver 710, processor 720, memory 730, and network interface 740. In some embodiments, transceiver 710 facilitates transmitting wireless signals to and receiving wireless signals from wireless device 121 (e.g., via an antenna), processor 720 executes instructions to provide some or all of the functionality described above as being provided by a network node 110, memory 730 stores the instructions executed by processor 720, and network interface 740 communicates signals to backend network components, such as a gateway, switch, router, Internet, Public Switched Telephone Network (PSTN), core network nodes or radio network controllers 130, etc.

Processor 720 may include any suitable combination of hardware and software implemented in one or more modules to execute instructions and manipulate data to perform some or all of the described functions of network node 110, such as those described above in relation to FIGS. 1-5 above. In some embodiments, processor 720 may include, for example, one or more computers, one or more central processing units (CPUs), one or more microprocessors, one or more applications, and/or other logic.

Memory 730 is generally operable to store instructions, such as a computer program, software, an application including one or more of logic, rules, algorithms, code, tables, etc. and/or other instructions capable of being executed by a processor. Examples of memory 730 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 740 is communicatively coupled to processor 720 and may refer to any suitable device operable to receive input for network node 110, send output from network node 110, perform suitable processing of the input or output or both, communicate to other devices, or any combination of the preceding. Network interface 740 may include appropriate hardware (e.g., port, modem, network interface card, etc.) and software, including protocol conversion and data processing capabilities, to communicate through a network.

Other embodiments of network node 110 may include additional components beyond those shown in FIG. 7 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 8:
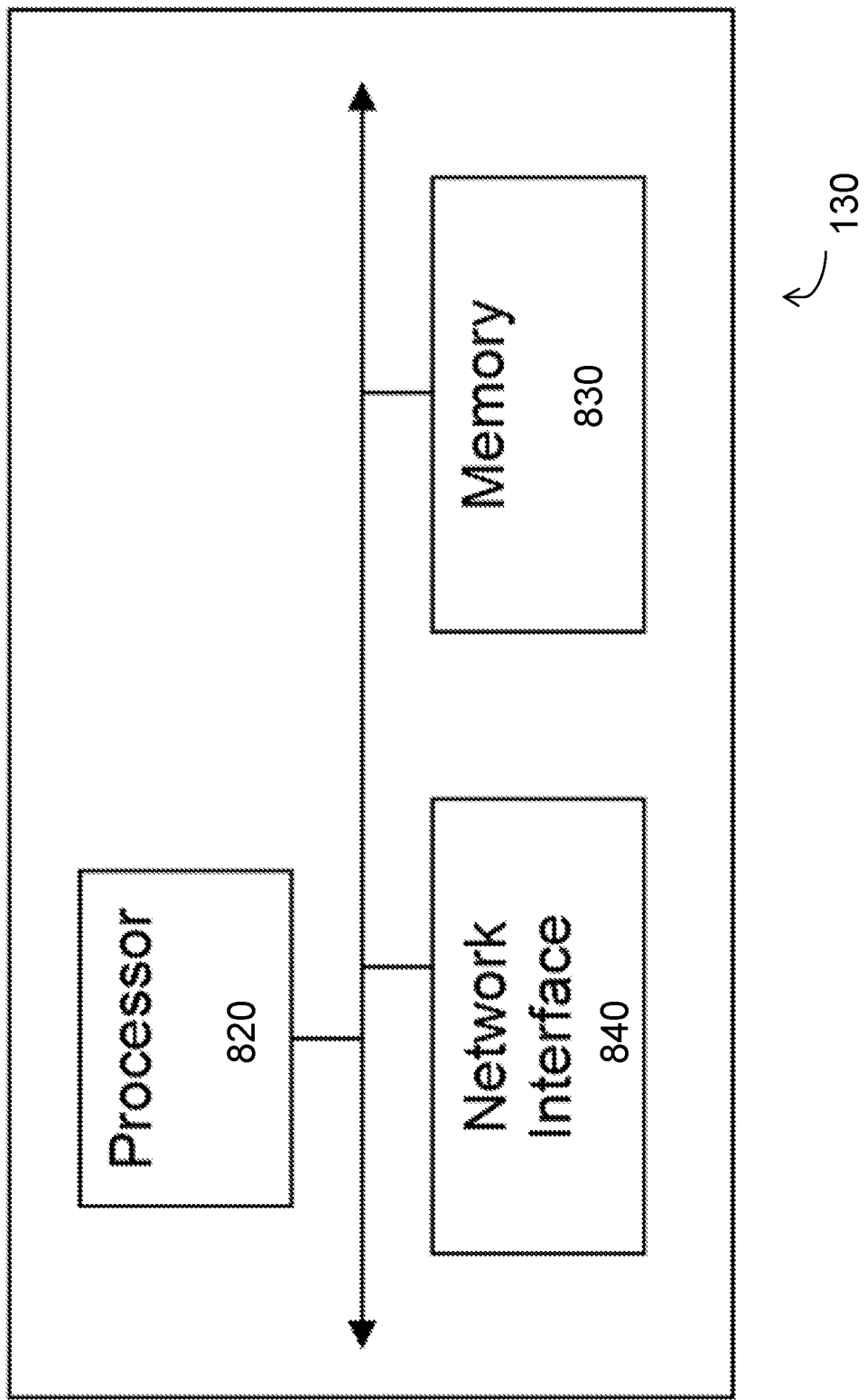
FIG. 8 is a block schematic of an exemplary radio network controller or core network node, in accordance with certain embodiments.

FIG. 8 is a block schematic of an exemplary radio network controller or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 130 includes processor 820, memory 830, and network interface 840. In some embodiments, processor 820 executes instructions to provide some or all of the functionality described above as being provided by the network node, memory 830 stores the instructions executed by processor 820, and network interface 840 communicates signals to any suitable node, such as a gateway, switch, router, Internet, Public Switched Telephone Network (PSTN), network nodes 110, radio network controllers or core network nodes 130, etc.

Processor 820 may include any suitable combination of hardware and software implemented in one or more modules to execute instructions and manipulate data to perform some or all of the described functions of the radio network controller or core network node 130. In some embodiments, processor 820 may include, for example, one or more computers, one or more central processing units (CPUs), one or more microprocessors, one or more applications, and/or other logic.

Memory 830 is generally operable to store instructions, such as a computer program, software, an application including one or more of logic, rules, algorithms, code, tables, etc. and/or other instructions capable of being executed by a processor. Examples of memory 830 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 840 is communicatively coupled to processor 820 and may refer to any suitable device operable to receive input for the network node, send output from the network node, perform suitable processing of the input or output or both, communicate to other devices, or any combination of the preceding. Network interface 840 may include appropriate hardware (e.g., port, modem, network interface card, etc.) and software, including protocol conversion and data processing capabilities, to communicate through a network.

Other embodiments of the network node may include additional components beyond those shown in FIG. 8 that may be responsible for providing certain aspects of the network node's functionality, including any of the functionality described above and/or any additional functionality (including any functionality necessary to support the solution described above).

Figure 9:
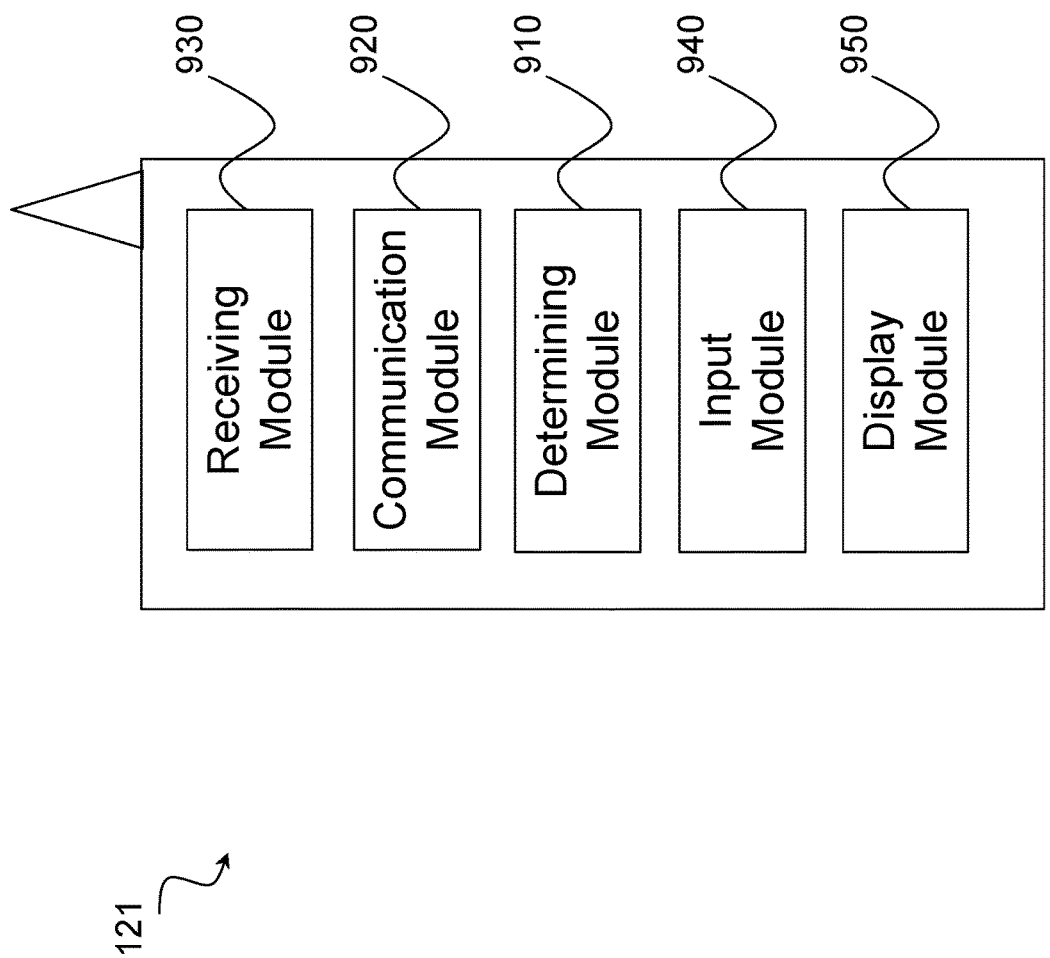
FIG. 9 is a block schematic of an exemplary wireless device, in accordance with certain embodiments.

FIG. 9 is a block schematic of an exemplary wireless device, in accordance with certain embodiments. Wireless device 121 may include one or more modules. For example, wireless device 121 may include a determining module 910, a communication module 920, a receiver module 930, an input module 940, a display module 950, and any other suitable modules. In certain embodiments, wireless device 121 may perform the methods for joint WAN and sidelink transmission for D2D communication described above with respect to FIGS. 1-5.

Determining module 910 may perform the processing functions of wireless device 121. For example, determining module 910 may determine that wireless device 121 is configured to receive signals over both a first communication link and a second communication link during at least partly overlapping time resources. As another example, determining module 910 may determine a status of at least one of a memory resource and a processor resource of wireless device 121 for signals received over both the first communication link and the second communication link. As still another example, determining module 910 may adapt one or more procedures related to reception of signals over one or both of the first communication link and the second communication link based at least in part on the determined status of the at least one of a memory resource and a processor resource of wireless device 910. As yet another example, determining module 910 may determine, based on received information about an adaptation of one or more transmission parameters by a network node, that additional memory and processor resources are available for signals received over the second communication link, and use the additional memory and processor resources available for signals received over the second communication link for one or more of soft combining a plurality of retransmissions over the second communication link and monitoring additional processes over the second communication link. Determining module 910 may include or be included in one or more processors, such as processor 620 described above in relation to FIG. 6. Determining module 910 may include analog and/or digital circuitry configured to perform any of the functions of determining module 910 and/or processor 620 described above. The functions of determining module 910 described above may, in certain embodiments, be performed in one or more distinct modules.

Communication module 920 may perform the transmission functions of wireless device 121. For example, communication module 920 may communicate capability information for the wireless device to a network node. Communication module 920 may transmit messages to one or more of network nodes 110 of network 100. Communication module 920 may include a transmitter and/or a transceiver, such as transceiver 610 described above in relation to FIG. 6. Communication module 920 may include circuitry configured to wirelessly transmit messages and/or signals. In particular embodiments, communication module 920 may receive messages and/or signals for transmission from determining module 910.

Receiving module 930 may perform the receiving functions of wireless device 121. As one example, receiving module 930 may receive, from a network node, information about an adaptation of one or more transmission parameters of one or both of the first communication link and the second communication link by the network node. Receiving module 930 may include a receiver and/or a transceiver, such as transceiver 610 described above in relation to FIG. 6. Receiving module 930 may include circuitry configured to wirelessly receive messages and/or signals. In particular embodiments, receiving module 930 may communicate received messages and/or signals to determining module 910.

Input module 940 may receive user input intended for wireless device 121. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 910.

Display module 950 may present signals on a display of wireless device 121. Display module 950 may include the display and/or any appropriate circuitry and hardware configured to present signals on the display. Display module 950 may receive signals to present on the display from determining module 910.

Determining module 910, communication module 920, receiving module 930, input module 940, and display module 950 may include any suitable configuration of hardware and/or software. Wireless device 121 may include additional modules beyond those shown in FIG. 9 that may be responsible for providing any suitable functionality, including any of the functionality described above and/or any additional functionality (including any functionality necessary to support the various solutions described herein).

Figure 10:
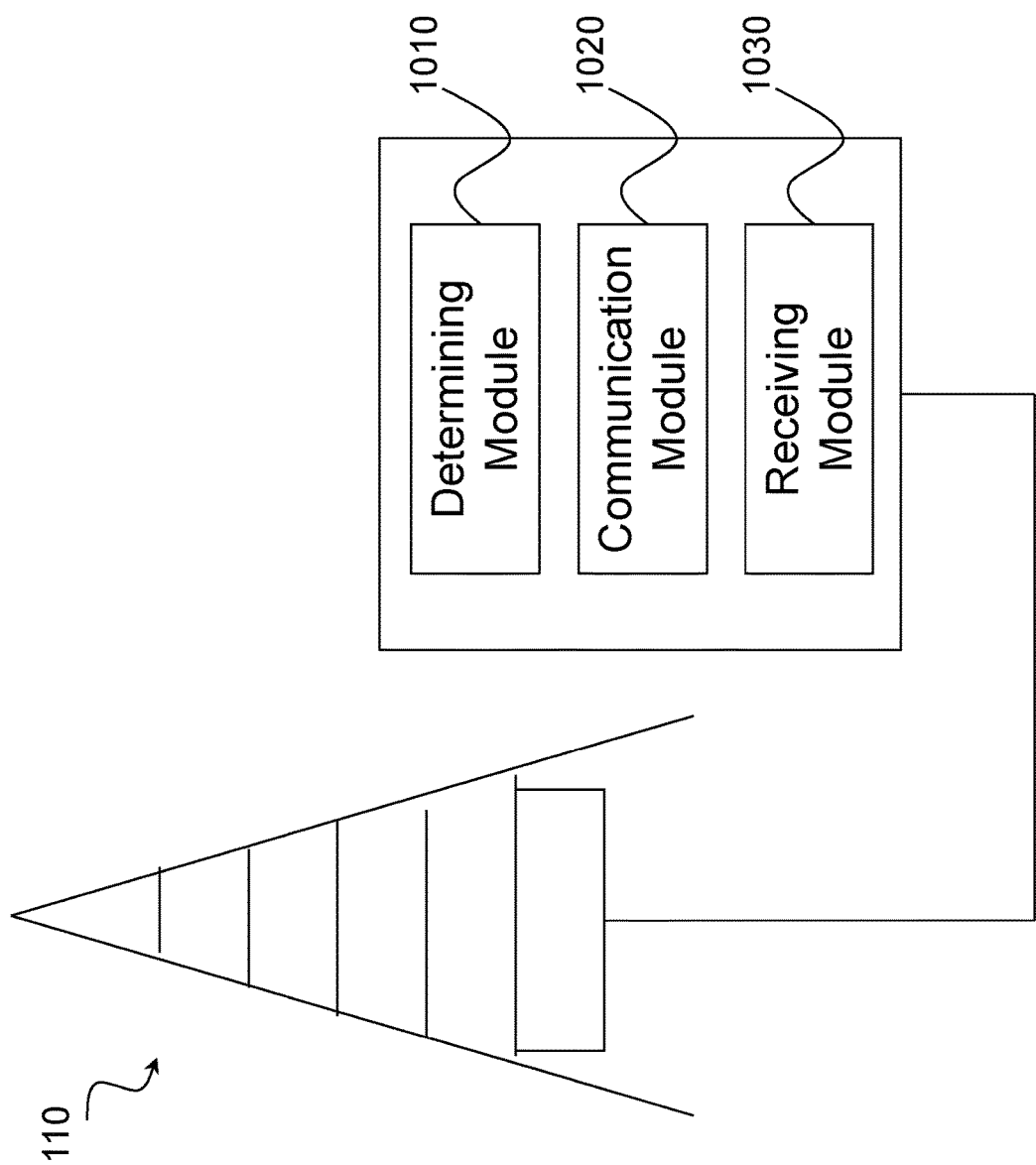
FIG. 10 is a block schematic of an exemplary network node, in accordance with certain embodiments.

FIG. 10 is a block schematic of an exemplary network node 110, in accordance with certain embodiments. Network node 110 may include one or more modules. For example, network node 110 may include determining module 1010, communication module 1020, receiving module 1030, and any other suitable modules. In some embodiments, one or more of determining module 1010, communication module 1020, receiving module 1030, or any other suitable module may be implemented using one or more processors, such as processor 720 described above in relation to FIG. 7. In certain embodiments, the functions of two or more of the various modules may be combined into a single module. In certain embodiments, network node 110 may perform the methods for joint WAN and sidelink transmission for D2D communication described above with respect to FIGS. 1-5.

Determining module 1010 may perform the processing functions of network node 110. As one example, determining module 1010 may determine whether a wireless device is configured to receive signals over both a first communication link and a second communication link during at least partly overlapping time resources. As another example, determining module 1010 may determine whether the wireless device has limited reception capability based at least in part on a comparison of at least one reception capability of the wireless device to a threshold. As still another example, determining module 1010, upon determining that the wireless device is configured to receive signals over both the first communication link and the second communication link during at least partly overlapping time resources and that the wireless device has limited reception capability, may adapt one or more transmission parameters of one or both of the first communication link and the second communication link. As yet another example, determining module 1010 may determine whether the wireless device is using or intends to use a data rate on the first communication link above a first threshold and/or determine whether the wireless device is using or intends to use a data rate on the second communication link above a second threshold.

Determining module 1010 may include or be included in one or more processors, such as processor 720 described above in relation to FIG. 7. Determining module 1010 may include analog and/or digital circuitry configured to perform any of the functions of determining module 1010 and/or processor 820 described above. The functions of determining module 1010 may, in certain embodiments, be performed in one or more distinct modules.

Communication module 1020 may perform the transmission functions of network node 110. As one example, communication module 1020 may communicate to the wireless device an indication of one or more adaptations to the one or more transmission parameters of one or both of the first communication link and the second communication link. Communication module 1020 may transmit messages to one or more of wireless devices 121. Communication module 1020 may include a transmitter and/or a transceiver, such as transceiver 710 described above in relation to FIG. 7. Communication module 1020 may include circuitry configured to wirelessly transmit messages and/or signals. In particular embodiments, communication module 1020 may receive messages and/or signals for transmission from determining module 1010 or any other module.

Receiving module 1030 may perform the receiving functions of network node 110. For example, receiving module 1030 may receive capability information for the wireless device. Receiving module 1030 may receive any suitable information from a wireless device. Receiving module 1030 may include a receiver and/or a transceiver, such as transceiver 710 described above in relation to FIG. 7. Receiving module 1030 may include circuitry configured to wirelessly receive messages and/or signals. In particular embodiments, receiving module 1030 may communicate received messages and/or signals to determining module 1010 or any other suitable module.

Determining module 1010, communication module 1020, and receiving module 1030 may include any suitable configuration of hardware and/or software. Network node 110 may include additional modules beyond those shown in FIG. 10 that may be responsible for providing any suitable functionality, including any of the functionality described above and/or any additional functionality (including any functionality necessary to support the various solutions described herein).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
WAN Wide Area Network
D2D Device to Device
UE User equipment
LTE Long term evolution
ProSe Proximity services
WCDMA Wideband code-division multiple access
GSM Global System for Mobile communications
EDGE Enhanced Data rate for GSM Evolution
WiMax Worldwide Interoperability for Microwave Access
UMB Ultra Mobile Broadband
BS Base station
UDN Ultra-Dense Network
SDN Software-Defined Network
RRU Remote Radio Unit
RRH Remote Radio Head
PDA Personal Digital Assistant
MD Machine Device
M2M Machine-to-Machine
CPE Customer-Premises Equipment
LME Laptop-Mounted Equipment
LEE Laptop-Embedded Equipment
DRX Discontinuous Reception
EPDCCH Enhanced PDCCH
PDCCH Physical downlink control channel
PDSCH Physical downlink data channel
PCFICH Physical control format indicator channel
PHICH Physical HARQ Indication Channel
RB Resource block
PRB Physical RB
VRB Virtual RB
PSSCH Physical sidelink share channel
PSDCH Physical sidelink discovery channel

The invention claimed is:

1. A method in a network node, comprising:
    determining whether a wireless device is configured to receive signals over both a first communication link and a second communication link during at least partly overlapping time resources;
    determining whether the wireless device has limited reception capability based at least in part on a comparison of at least one reception capability of the wireless device to a threshold;
    upon determining that the wireless device is configured to receive signals over both the first communication link and the second communication link during at least partly overlapping time resources and that the wireless device has limited reception capability, adapting one or more transmission parameters of one or both of the first communication link and the second communication link; and
    communicating, to the wireless device, information about an adaptation of one or more transmission parameters of one or both of the first communication link and the second communication link, wherein the wireless device, upon receiving information about an adaptation of one or more transmission parameters of one or both of the first communication link and the second communication link, is configured to
    determine, based on the received information about the adaptation of one or more transmission parameters by the network node, that additional memory and processor resources are available for signals received over the second communication link; and
    use the additional memory and processor resources available for signals received over the second communication link for one or more of operations to:
        soft combine a plurality of retransmissions over the second communication link; and
        monitor additional processes over the second communication link.

2. The method of claim 1, wherein determining whether the wireless device is configured to receive signals over both the first communication link and the second communication link during at least partly overlapping time resources comprises retrieving a configuration for the wireless device from a memory of the network node.

3. The method of claim 1, comprising:
    receiving capability information for the wireless device, wherein the received capability information comprises one or more reception capabilities of the wireless device, the one or more reception capabilities comprising one or more of:
    an indication of a maximum data rate for one or both of the first communication link and the second communication link;
    an indication of a maximum data block size for one or both of the first communication link and the second communication link;
    an indication of one or more adaptations to the one or more transmission parameters of one or both of the first communication link and the second communication link; and
    one or more characteristics of a transport format supported by the wireless device.

4. The method of claim 3, wherein determining whether the wireless device has limited reception capability comprises:
    comparing at least one of the one or more reception capabilities of the received capability information to one or more thresholds; and
    determining, based on the comparison of the at least one reception capability to the one or more thresholds, whether the wireless device has limited reception capability.

5. The method of claim 1, wherein determining whether the wireless device has limited reception capability comprises:
    evaluating one or more reception capabilities of the wireless device related to reception of signals over the first communication link and the second communication link; and
    comparing at least one of the one or more reception capabilities of the wireless device to one or more thresholds, the one or more reception capabilities comprising one or more of:
    a data rate for one or both of the first communication link and the second communication link over one or more previous time resources;
    a data throughput for one or both of the first communication link and the second communication link over one or more previous time resources.

6. The method of claim 1, wherein adapting one or more transmission parameters of one or both of the first communication link and the second communication link comprises one or more of:

adjusting a transport format of the first communication link to enable the wireless device to use fewer resources for receiving signals over the first communication link;
reducing a number of physical channels used for the first communication link to enable the wireless device to use fewer resources for receiving signals over the first communication link;
limiting a maximum number of hybrid-acknowledgement repeat request processes used for the first communication link; and
increasing a number of time resources used for receiving signals over the second communication link.

7. The method of claim 1, comprising:
determining whether the wireless device is using or intends to use a data rate on the first communication link above a first threshold;
determining whether the wireless device is using or intends to use a data rate on the second communication link above a second threshold; and
wherein adapting one or more transmission parameters of one or both of the first communication link and the second communication link is based at least in part on whether the data rate on the first communication link is determined to be above the first threshold and whether the data rate on the second communication link is determined to be above the second threshold.

8. The method of claim 7, wherein determining whether the wireless device is using or intends to use a data rate on the first communication link above a first threshold comprises determining an amount of data for the wireless device in a buffer of the network node.

9. The method of claim 7, wherein determining whether the wireless device is using or intends to use a data rate on the second communication link above a second threshold comprises one or more of:
detecting reception of one or more uplink subframes by one or more other wireless devices over the second communication link;
receiving an indication from the wireless device that the wireless device is receiving signals over the second communication link;
receiving an indication that the wireless device is capable of using soft combining for receiving signals over the second communication link; and
receiving an indication from the wireless device that the wireless device has limited reception capabilities in terms of one or more of:
a maximum data rate while receiving signals over both the first communication link and the second communication link;
a maximum size of a soft buffer that can be supported while the wireless device is receiving signals over both the first communication link and the second communication link;
a preferred transport format for the first communication link; and
a preferred or a maximum number of HARQ processes.

10. The method of claim 1, wherein the first communication link comprises a wide area network communication link and the second communication link comprises a device-to-device communication link.

11. The method of claim 1, wherein the wireless device comprises a device-to-device capable wireless device.

12. A method in a wireless device, comprising:
determining that the wireless device is configured to receive signals over both a first communication link and a second communication link during at least partly overlapping time resources;
determining a status of at least one of a memory resource and a processor resource of the wireless device for signals received over both the first communication link and the second communication link;
receiving, from a network node, information about an adaptation of one or more transmission parameters of one or both of the first communication link and the second communication link by the network node;
adapting one or more procedures related to reception of signals over one or both of the first communication link and the second communication link based at least in part on the determined status of the at least one of a memory resource and a processor resource of the wireless device;
determining, based on the received information about the adaptation of one or more transmission parameters by the network node, that additional memory and processor resources are available for signals received over the second communication link; and
using the additional memory and processor resources available for signals received over the second communication link for one or more of:
soft combining a plurality of retransmissions over the second communication link; and
monitoring additional processes over the second communication link.

13. The method of claim 12, wherein adapting one or more procedures related to reception of signals over one or both of the first communication link and the second communication link is further based at least in part on the received information about the adaptation of one or more transmission parameters by the network node.

14. The method of claim 12, wherein adapting one or more procedures related to reception of signals over one or both of the first communication link and the second communication link based at least in part on the determined status of at least one of the wireless device's memory and processor resources comprises one or more of:
modifying one or more parameters related to a reception algorithm used by a receiver of the wireless device;
combining fewer retransmissions;
selecting fewer processes to monitor on one of the first communication link and the second communication link;
modifying a first portion of a buffer associated with the first communication link and a second portion of the buffer associated with the second communication link.

15. The method of claim 12, comprising communicating capability information for the wireless device to a network node, wherein the communicated capability information comprises one or more of:
an indication of a maximum data rate for one or both of the first communication link and the second communication link;
an indication of a maximum data block size for one or both of the first communication link and the second communication link;
an indication of one or more adaptations to the one or more transmission parameters of one or both of the first communication link and the second communication link; and
one or more characteristics of a transport format supported by the wireless device.

16. The method of claim 12, wherein the first communication link comprises a wide area network communication link and the second communication link comprises a device-to-device communication link.

17. The method of claim 12, wherein the wireless device comprises a device-to-device capable wireless device.

18. A network node, comprising:
one or more processors, the one or more processors configured to:
determine whether a wireless device is configured to receive signals over both a first communication link and a second communication link during at least partly overlapping time resources;
determine whether the wireless device has limited reception capability based at least in part on a comparison of at least one reception capability of the wireless device a threshold;
upon determining that the wireless device is configured to receive signals over both the first communication link and the second communication link during at least partly overlapping time resources and that the wireless device has limited reception capability, adapt one or more transmission parameters of one or both of the first communication link and the second communication link; and
communicate, to the wireless device, information about an adaptation of one or more transmission parameters of one or both of the first communication link and the second communication link, wherein the wireless device, upon receiving information about an adaptation of one or more transmission parameters of one or both of the first communication link and the second communication link, is configured to:
determine, based on the received information about the adaptation of one or more transmission parameters by the network node, that additional memory and processor resources are available for signals received over the second communication link; and
use the additional memory and processor resources available for signals received over the second communication link for one or more of operations to:
soft combine a plurality of retransmissions over the second communication link; and
monitor additional processes over the second communication link.

19. A wireless device, comprising:
one or more processors, the one or more processors configured to:
determine that the wireless device is configured to receive signals over both a first communication link and a second communication link during at least partly overlapping time resources;
determine a status of at least one of a memory resource and a processor resource of the wireless device for signals received over both the first communication link and the second communication link;
receive, from a network node, information about an adaptation of one or more transmission parameters of one or both of the first communication link and the second communication link by the network node;
adapt one or more procedures related to reception of signals over one or both of the first communication link and the second communication link based at least in part on the determined status of the at least one of a memory resource and a processor resource of the wireless device;
determine, based on the received information about the adaptation of one or more transmission parameters by the network node, that additional memory and processor resources are available for signals received over the second communication link; and
use the additional memory and processor resources available for signals received over the second communication link for one or more of:
soft combining a plurality of retransmissions over the second communication link; and
monitoring additional processes over the second communication link.

20. The wireless device of claim 19, wherein adapting one or more procedures related to reception of signals over one or both of the first communication link and the second communication link is further based at least in part on the received information about the adaptation of one or more transmission parameters by the network node.

21. The wireless device of claim 19, wherein the one or more processors configured to adapt one or more procedures related to reception of signals over one or both of the first communication link and the second communication link based at least in part on the determined status of at least one of the wireless device's memory and processor resources comprise one or more processors configured to perform one or more of:
modify one or more parameters related to a reception algorithm used by a receiver of the wireless device;
combine fewer retransmissions;
select fewer processes to monitor on one of the first communication link and the second communication link;
modify a first portion of a buffer associated with the first communication link and a second portion of the buffer associated with the second communication link.

22. The wireless device of claim 19, wherein the one or more processors are configured to communicate capability information for the wireless device to a network node, wherein the communicated capability information comprises one or more of:
an indication of a maximum data rate for one or both of the first communication link and the second communication link;
an indication of a maximum data block size for one or both of the first communication link and the second communication link;
an indication of one or more adaptations to the one or more transmission parameters of one or both of the first communication link and the second communication link; and
one or more characteristics of a transport format supported by the wireless device.

23. The wireless device of claim 19, wherein the first communication link comprises a wide area network communication link and the second communication link comprises a device-to-device communication link.

24. The wireless device of claim 19, wherein the wireless device comprises a device-to-device capable wireless device.

* * * * *